United States Patent
Chan et al.

(10) Patent No.: US 8,319,627 B2
(45) Date of Patent: *Nov. 27, 2012

(54) METHOD AND SYSTEM FOR INTELLIGENT ENERGY NETWORK MANAGEMENT CONTROL SYSTEM

(75) Inventors: Tat-Keung Chan, South San Francisco, CA (US); Elsa A. Chan, San Francisco, CA (US)

(73) Assignee: Jetlun Corporation, South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/536,889

(22) Filed: Jun. 28, 2012

(65) Prior Publication Data
US 2012/0269199 A1  Oct. 25, 2012

Related U.S. Application Data

(63) Continuation of application No. 12/550,382, filed on Aug. 30, 2009.

(60) Provisional application No. 61/161,050, filed on Mar. 17, 2009.

(51) Int. Cl.
*G08B 1/08* (2006.01)

(52) U.S. Cl. .................. 340/538; 340/12.32; 340/13.23; 340/288; 700/297; 700/286; 700/292

(58) Field of Classification Search .................. 340/538, 340/310.11, 310.13, 12.32, 13.23, 288; 709/250, 709/218; 370/463, 208, 210; 700/297, 286, 700/292
See application file for complete search history.

(56) References Cited

U.S. PATENT DOCUMENTS

| 6,130,896 | A | * | 10/2000 | Lueker et al. | 370/469 |
|---|---|---|---|---|---|
| 6,958,680 | B2 | * | 10/2005 | Kline | 370/487 |
| 7,136,936 | B2 | * | 11/2006 | Chan et al. | 709/250 |
| 7,813,099 | B2 | * | 10/2010 | Chan | 361/119 |
| 2003/0085795 | A1 | * | 5/2003 | An | 340/3.1 |
| 2008/0088419 | A1 | * | 4/2008 | Chan | 340/310.13 |
| 2008/0165463 | A1 | * | 7/2008 | Chan | 361/93.1 |
| 2011/0054700 | A1 | * | 3/2011 | Chan et al. | 700/277 |

* cited by examiner

*Primary Examiner* — Hoi Lau
(74) *Attorney, Agent, or Firm* — Richard T. Ogawa; Ogawa P.C.

(57) ABSTRACT

A system for providing network infrastructure for energy management and control is disclosed. A controller integrates powerline and wireless networking technologies in order to provide an integrated network. A gateway sends and receives command and control data across the integrated network. Client devices may connect to the integrated network and perform a variety of functions. An appliance module may send and receive data across the integrated network in relation to a particular appliance. A panel meter may send and receive data across the integrated network in relation to data measured at a distribution panel. A serial bridge may connect various devices to the integrated network. Computing devices may remotely or locally connect to the integrated network and send and receive data.

20 Claims, 25 Drawing Sheets

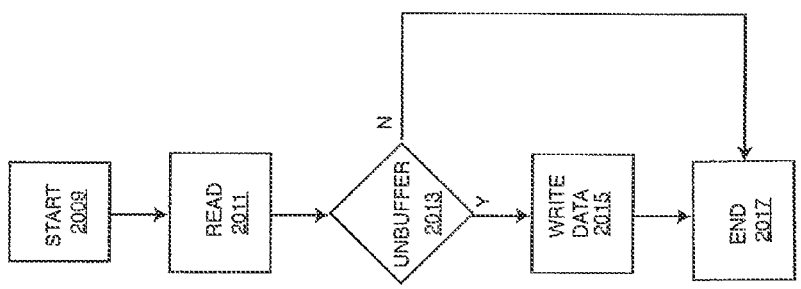
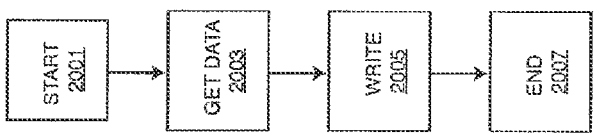
FIG. 20

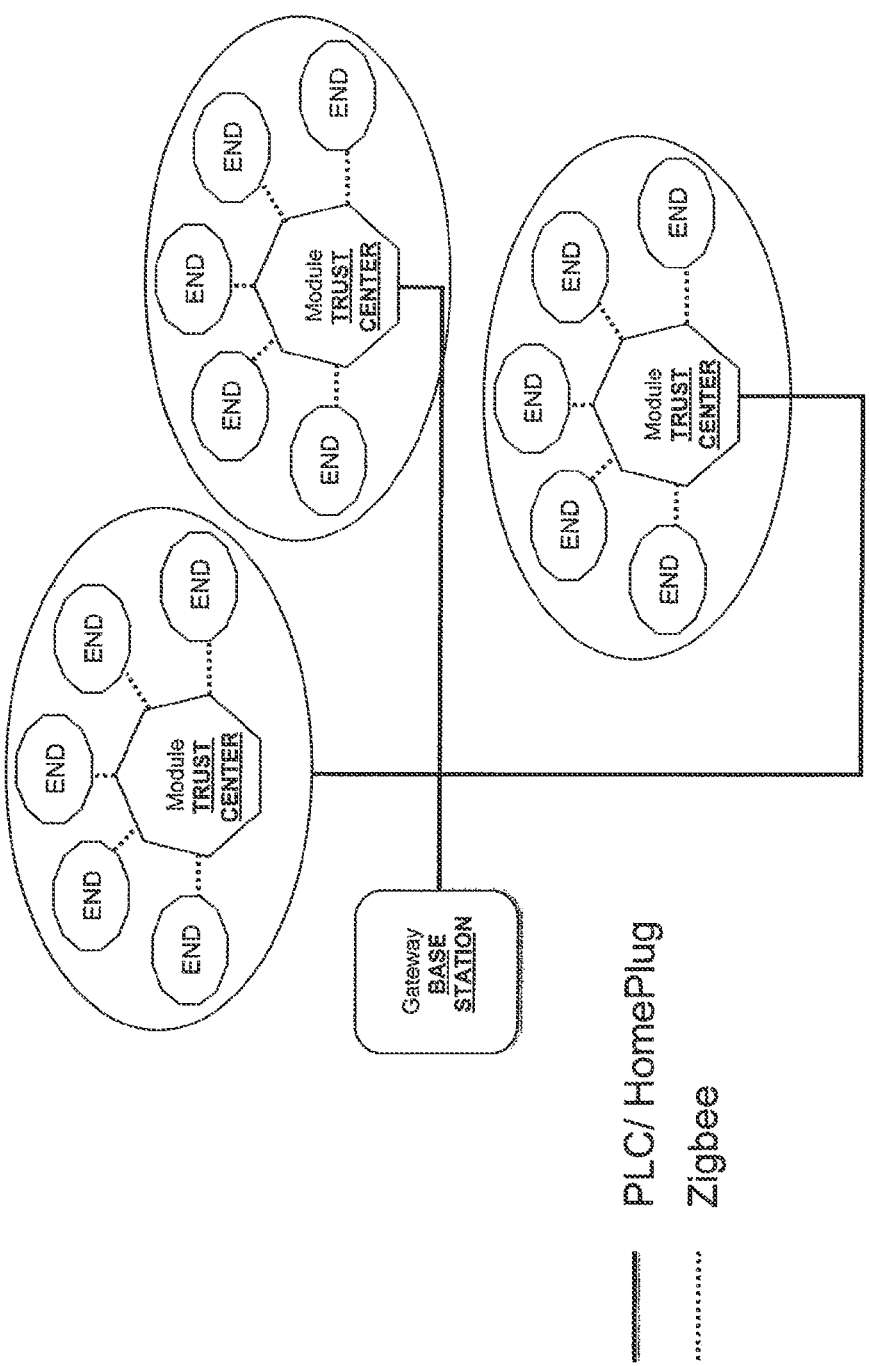

METHOD AND SYSTEM FOR INTELLIGENT ENERGY NETWORK MANAGEMENT CONTROL SYSTEM

CROSS-REFERENCES TO RELATED APPLICATIONS

The present application is a continuation of and claims priority to U.S. Ser. No. 12/550,382 filed Aug. 30, 2009, and U.S. Ser. No. 61/161,050 filed Mar. 17, 2009, commonly assigned, and each of which is hereby incorporated by reference herein.

STATEMENT AS TO RIGHTS TO INVENTIONS MADE UNDER FEDERALLY SPONSORED RESEARCH AND DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates to creating the networking infrastructure for energy monitoring and control systems used for monitoring, controlling, and transmitting information via AC wiring or wirelessly, such as via the HomePlug™ or ZigBee™ standards, among others. More specifically, the present invention relates to the central management of power usage via the deployment of sensors and devices to monitor data and the implementation of controls via an integrated network, including a powerline and wireless network controller. Furthermore, the present invention relates to specific applications of an integrated powerline and wireless network deployment.

Human population has exploded! Concurrent with the increase in the population, energy consumption has increased at a similar or greater pace. We have consumed and continue to use high levels of fossil fuels, including oil and coal. To help fulfill the needs of our energy requirements, renewable energy sources have also been developed. These renewable energy sources include hydroelectric plants, nuclear sources, solar, windmills, and others. Although successful in part, the International Energy Agency projects further demands in oil and energy consumption in China and India accounting for most of the increases in the future. Accordingly, other alternative sources of energy require development.

As sources of energy are being developed, challenges in monitoring and controlling energy also exist. That is, there is simply no easy way to monitor and control the use of energy in wide scale applications ranging from home appliances, lighting, and other uses. Conventional meters have been developed to monitor certain specific applications. Although somewhat successful, conventional meters cannot monitor a wide variety of applications in a timely and real time basis. These and other limitations are described throughout the present specification and more particularly below.

From the above, it is seen that techniques for improving solar devices is highly desirable.

BRIEF SUMMARY OF THE INVENTION

The present invention may be embodied as an energy monitoring and control system for monitoring and controlling individual loads and transmitting energy usage information over conventional AC wiring or wireless media. The system includes a controller for integrating powerline and wireless network and for creating network infrastructure. The system further includes an energy monitor unit for each appliance load that plugs into a standard AC wall outlet and monitors power consumption and also has a wireless transmitter and receiver for communicating with wireless sensors and devices on the network and a power line transmitter and receiver for communicating with a gateway master control station. The system also includes an energy monitor unit for a distribution system that has a power line transmitter and receiver or a wireless transmitter and receiver for communicating with the gateway according to one or more embodiments. The system also includes a serial bridge for serial devices on the network that have a power line transmitter and receiver or a wireless transmitter and receiver for communicating with the gateway. The gateway receives energy usage data from each of the energy monitor units and serial bridges, stores the data, displays the data in various user-selectable formats such as a web browser, a cell phone or PDA, and provides an interface to control the various energy monitor units on the network. The gateway also connects to the World Wide Web (WWW) or an external data source to allow remote monitoring and control of the network.

In a specific embodiment, the present invention provides a system for monitoring and controlling power usage in, for example, a home, buildings, apartments, hospitals, schools, factories, office buildings, industrial areas setting, and other regions. The system has a gateway apparatus. The gateway apparatus has a powerline module configured to transmit information at one or more first frequencies ranging from about 1 to 30 MHz. In a specific embodiment, the powerline module is coupled to a powerline network, which is coupled to one or more appliances, e.g., computer, refrigerator, furnace, air conditioning, lighting. The gateway has a control module configured to transmit information at one or more second frequencies ranging from about 250 KHz to 400 KHz. In a specific embodiment, the control module is configured to control one or more appliances coupled to the power line from information received from one or more appliances. The gateway has a wireless module configured to transmit information at one or more third frequencies of about 2.4 GHz. The system has a circuit sensor device comprising a plurality of input sites, which are coupled to respective circuit breaker elements in a circuit distribution panel. The circuit sensor device is coupled to the powerline module via one or more powerline networks to transmit power consumption information in either at least real time or a selected time frequency. The system has a panel device comprising a first input, a second input, and a third input respectively coupled to a power source including a first phase, a second phase, and a third phase. In a specific embodiment, the panel sensor device is configured to output power information. The system has an appliance module coupled to the gateway apparatus. The appliance module is configured to turn on or turn off one or more appliances, which are coupled to the control module using either or both of wireless module or the control module.

In one or more embodiments, the present invention provides a network infrastructure configured to connect to new smart meters, sensors or client devices to the World Wide Web and to allow remote monitoring of such devices via computing devices, such as a personal computer or mobile device. It is accordingly another embodiment, the present invention provides the network infrastructure configured to connect various appliances or client devices to the World Wide Web and allow remote command or control of such devices. Of course, there can be other variations, modifications, and alternatives.

Furthermore, it is another embodiment of the present invention to integrate a variety of network media into a central controller such that wireless, powerline, broadband, or other communications media may be utilized for extending network connectivity, reducing signal interference, and increasing device interoperability in an energy management command and control application.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 20 is a simplified software buffer process flow diagram for the RS232 Bridge and RS485 Bridge according to an embodiment in the present invention;

FIG. 25 is an alternative simplified diagram illustrating a Powerline and Zigbee bridging network according to an embodiment in the present invention.

DETAILED DESCRIPTION OF THE INVENTION

Figure 1:
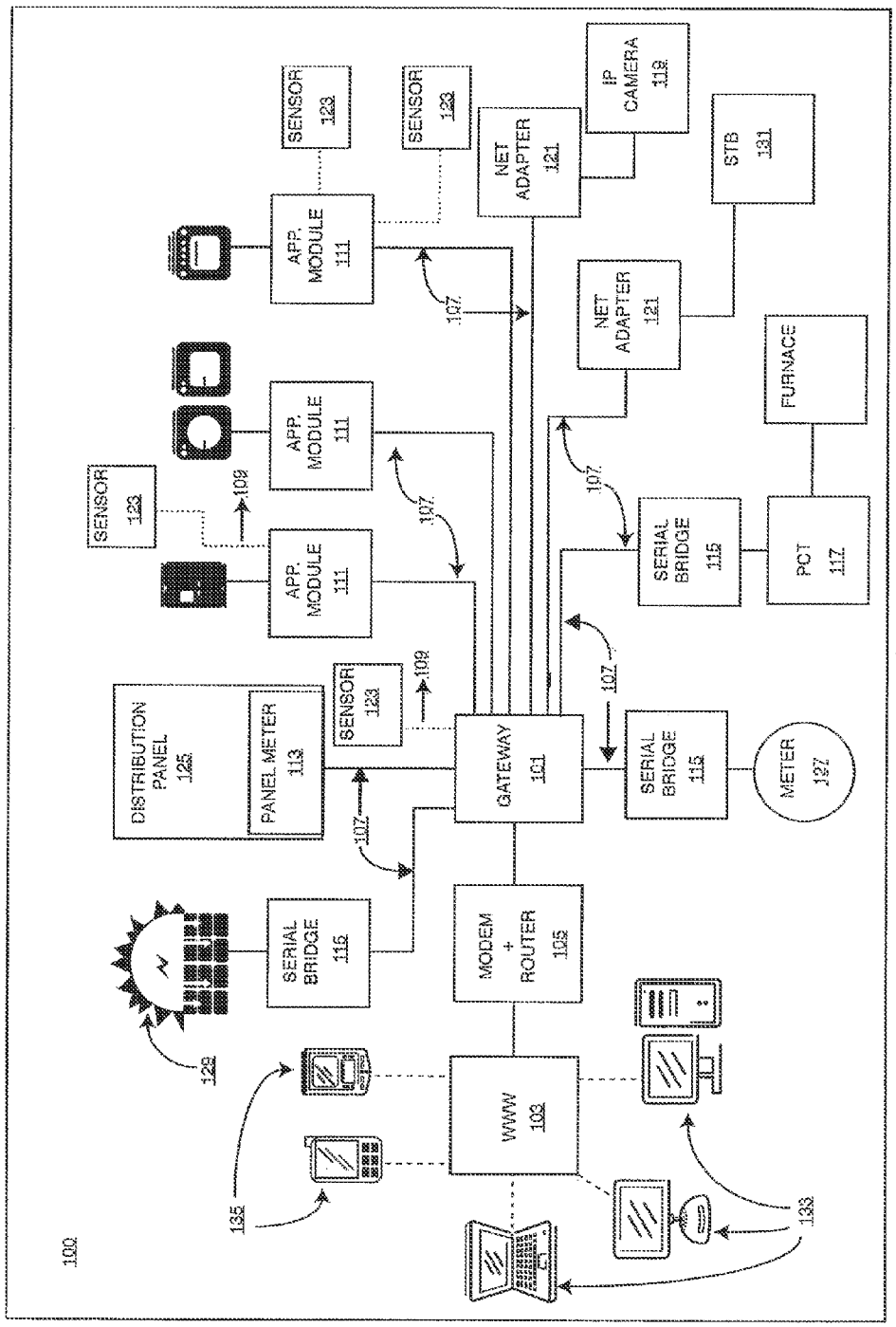
FIG. 1 is a simplified diagram of the system according to an embodiment in the present invention.

According to the present invention, techniques for monitoring and controlling various appliances or client devices are provided. As an exemplary embodiment, the invention has been applied to a single-family home. The invention may also be embodied with applications to buildings, apartments, hospital, schools, factories, office buildings, industrial areas, any combinations of these, or other networking applications.

We identified that government regulators have been looking for techniques to match energy consumption with its generation. We have discovered that traditional electrical meters only measure total consumption and as such provide little information of when or how the energy was consumed. Conventional smart meters provide a way of measuring energy consumption in time intervals, allowing price-setting agencies to introduce different prices for consumption based on the time of day and the season.

Electricity pricing usually peaks at certain predictable times of the day and the season. In particular, if generation is constrained, prices can rise significantly during these times as more expensive sources of power are purchased from other jurisdictions or more costly generation is brought online. It is believed that billing customers by how much is consumed and at what time of day will force consumers to adjust their consumption habits to be more responsive to market prices. Regulatory and market design agencies hope these "price signals" will delay the construction of additional generation or at least the purchase of energy from higher priced sources thereby controlling the steady and rapid increase of electricity prices.

With the rising cost of home energy use and the imminent rollout of Time-of-Use (TOU) billing from the power utilities, it has become desirable to know the quantity and the time of use of electrical power consumed by various household appliances so that inefficient uses of electricity can be eliminated and electricity usage can be shifted to off-peak periods. Conventional smart meters in limited usage today provide some solutions to these problems. But even with the conventional smart meters, it is only provided the total consumption based on the time of day and season. Such meters do not provide granular energy usage information that allows a user to pinpoint which device or appliance in the home or office is drawing the most power. This prevents a user from being informed as to which device or appliance can be turned off during peak times when prices are high.

In solving these problems of energy consumption measurement and control, an energy management system (EMS) provides a real-time measurement of the energy consumed by the various electrical loads within the electrical distribution system. With these measurements, a user can pinpoint sources of energy use and remotely control the electrical loads within the electrical distribution system either by turning on or off appliances. Most EMS systems are tailored for industrial commercial loads such as a heating ventilation and air conditioning (HVAC) in a hotel or factory.

Moreover, conventional network devices often freeze about running for a period of time where the software may lock-up, thereby requiring some physical reset either by turning-on or off the device or unplugging or plugging the device. Since this creates problem for service providers, it would be desirable to provide appropriate solution.

Furthermore, while home automation is greatly appreciated when power is adequate, such is not so during electricity brown or black-out, especially for home automation that is connected to important functions like security systems. Thus it would be desirable as well to provide appropriate solution. These and other limitations of conventional energy monitoring techniques are overcome by the present method and systems according to one or more embodiments.

FIG. 1 is a simplified diagram of the energy monitoring and control system 100 according to an embodiment of the present invention. This diagram is merely an example, which should not unduly limit the scope of the claims herein. A person having ordinary skill in the art would recognize many variations, alternatives, and modifications. As shown, the system 100 for an energy monitoring and control network is included. The system 100 has a gateway 101 that is coupled to the external data source 103, which is derived from a modem or router 105 that connects to a world-wide network of computers or world-wide web (WWW) 103 and provides multiple IP addresses to the system 100, and is then coupled to a plurality of client devices through AC wiring 107 or wirelessly 109. A plurality of computing devices 133 and mobile devices 135 can monitor and control the gateway 101 and client devices residing behind the gateway.

The gateway 101 may be adapted to collect, aggregate, store, receive and or transmit information, and is also adapted to bridge various network media together. The gateway 101 is adapted to bridge low speed and high-speed powerline technologies and ZigBee wireless technology together. In alternative embodiments, wireless technology can include other wireless technologies such as wireless 802.11 standards, Zwave, 6lowPAN, or others. As merely an example, the gateway 101 may be a product manufactured by Jetlun Corporation of South San Francisco, Calif., under the part number RD75606. Client devices may include a variety of apparatus connected through premises AC wiring 107 or wirelessly 109, such as appliance module 111, panel meter 113, serial bridge 115, network adapter 121, or a variety of sensors 123.

An appliance module 111 can connect to a variety of appliances and devices such as refrigerator, washer and dryer, range, stove, microwave, personal computer, television, or other appliance. An appliance module 111 may be adapted to measure, store and or control energy usage of connected appliances or devices, bridge Zigbee wireless sensors and devices to the network, or receive and transmit information across network infrastructure. As merely an example, the appliance module 111 may be a product manufactured by Jetlun Corporation of South San Francisco, Calif., under the part number RD75613.

A panel meter 113 may be connected to an electrical circuit breaker panel or distribution panel 125. A panel meter 113 may be adapted to measure and or store energy consumption information of up to three (3) phases of power coming into the home or building inside the electrical circuit breaker panel or distribution panel 125. As merely an example, the panel meter 113 may be a product manufactured by Jetlun Corporation of South San Francisco, Calif. or others.

A serial bridge can be connected to any serial-enabled device such as a variety of gas, electric or water meters 127, solar power inverters 129, programmable controllable thermostats (PCT) 117 or other devices. Serial bridge 115 may be adapted to capture and or store serial analog data to IP digital data and receive and or transmit information. As merely an example, Jetlun Corporation of South San Francisco, Calif., manufactures two (2) types of serial bridges—one with a RS232 interface under the part number RD75617 and the other with a RS485 interface under the part number RD75618, but can be others.

A network adapter may be an apparatus adapted to convert the signal from AC wiring 107 to an IP signal and can receive and transmit information. A network adapter can be connected to a variety of IP devices such as IP Camera 119, Set-top-box (STB) 131, and others. As merely an example, Jetlun Corporation of South San Francisco, Calif., manufactures a variety of network adapters, including Powerline-to-Ethernet Adapter under the part number RD31101 and RD31201, Powerline-to-Wireless Adapter under the part number RD31203, Powerline-to-Coax Adapter under the part number RD31202, Powerline-to-Power-over-Ethernet (PoE) Adapter under the part number RD31212, and Powerline-to-Print Server under the part number RD31216. A sensor 123 may be adapted to detect or measure a physical property and send receive and transmit to an appliance module 111 or gateway 101 over AC wiring 107 or wirelessly 109.

Figure 2:
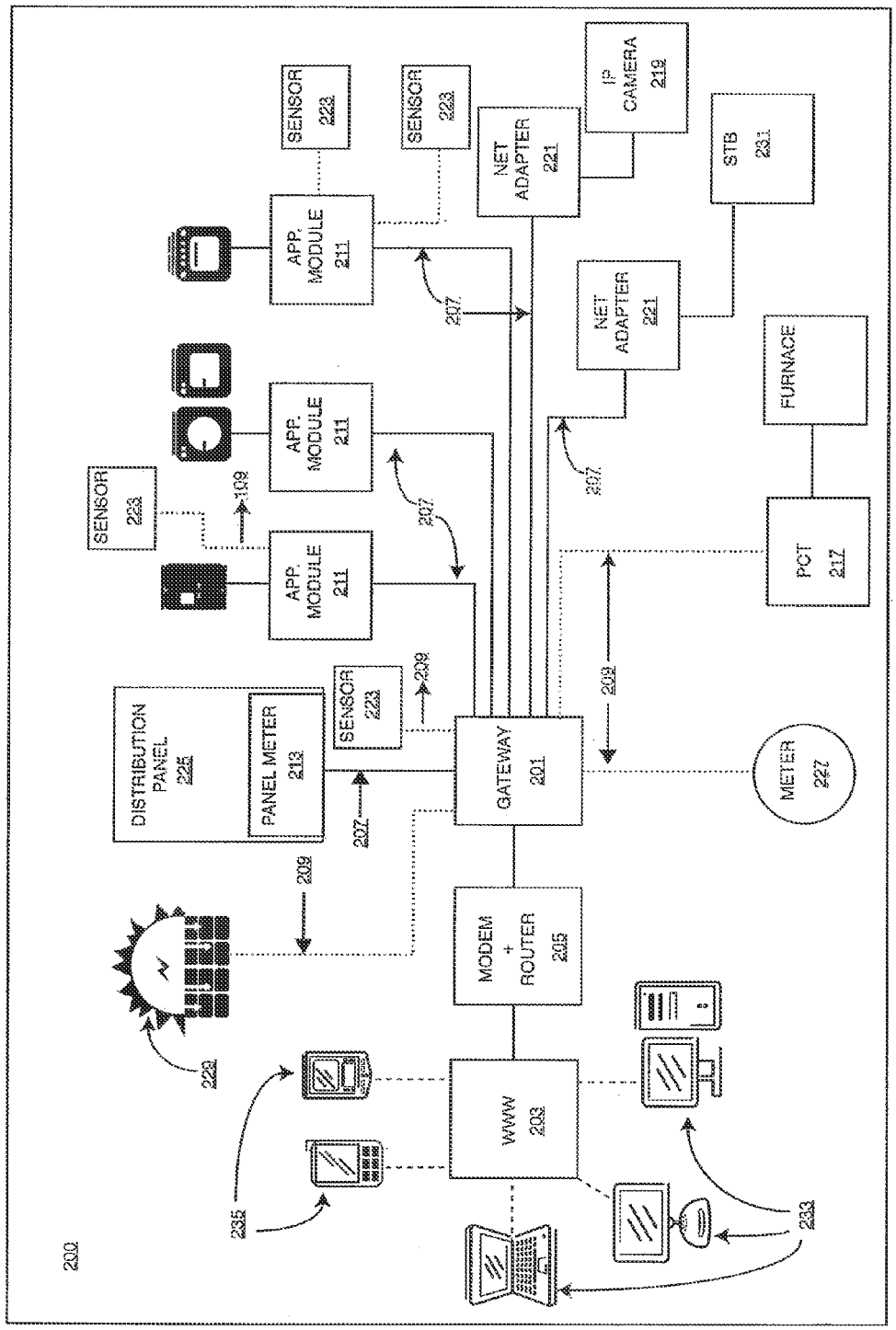
FIG. 2 is an alternate simplified diagram of the system utilizing increased wireless networking according to an embodiment in the present invention.

FIG. 2 is an alternate simplified diagram of the system 200 according to an embodiment in the present invention and illustrating further wireless network connectivity. This diagram is merely an example, which should not unduly limit the scope of the claims herein. A person having ordinary skill in the art would recognize many variations, alternatives, and modifications. As shown in FIG. 2, the system 200 for an energy monitoring and control network similar to FIG. 1 as described above and incorporates the previous description by reference. The system 200 further illustrates how a variety of gas, electric and water meters 227, solar power inverters 229, programmable controllable thermostats (PCT) 217, and sensors 223 can be connected or networked to the gateway wirelessly 209. FIG. 2 illustrates the flexibility of the system and method of the present embodiment and the ability to bridge wireless and powerline networking technologies in provisioning a robust networking infrastructure capable of integrating different networking media.

Figure 3:
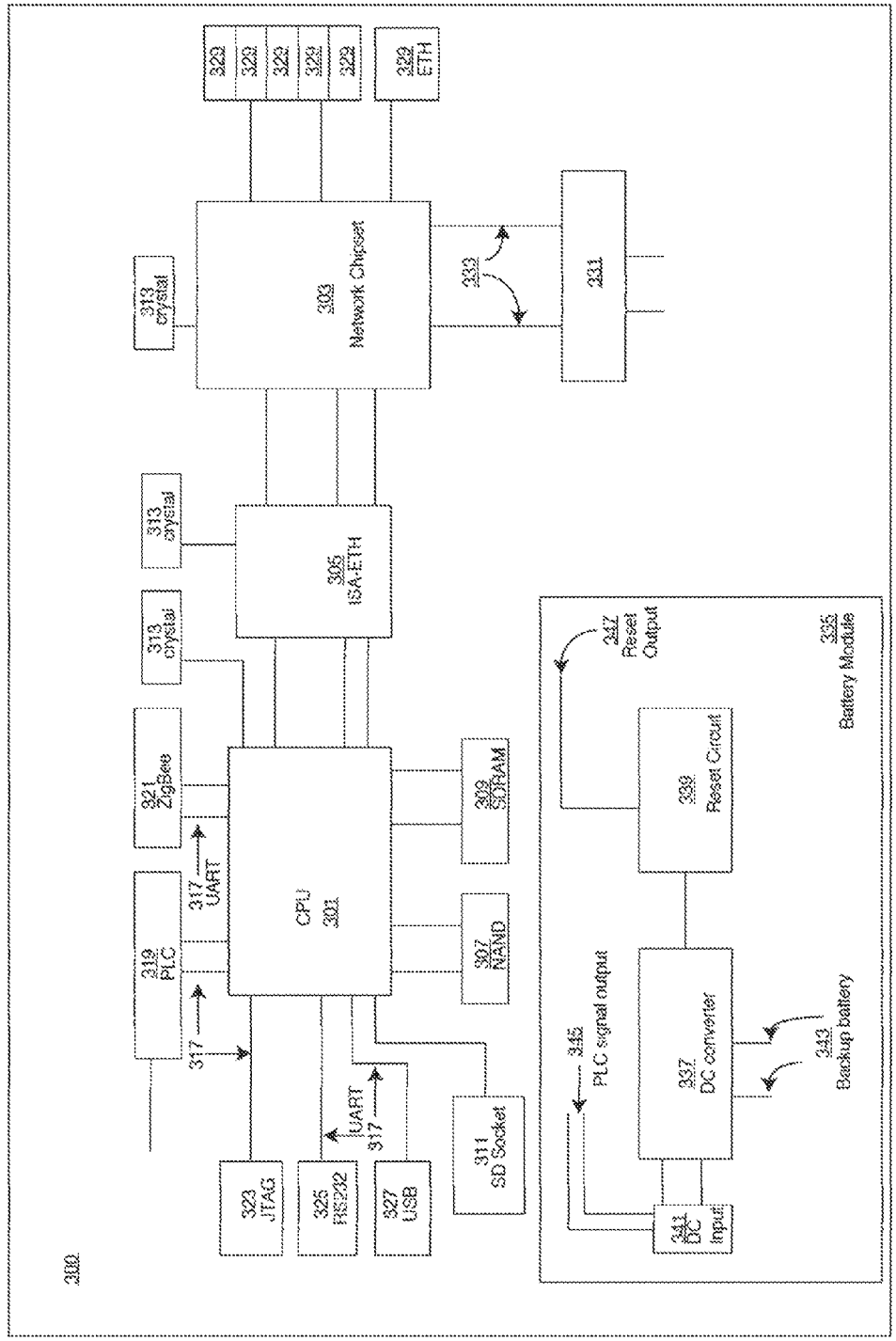
FIG. 3 is a simplified block diagram of the gateway according to an embodiment in the present invention.

FIG. 3 is a simplified block diagram of the gateway 300 according to an embodiment in the present invention. Gateway 101 of FIG. 1 and gateway 201 of FIG. 2 is shown in greater detail 300 in FIG. 3. This diagram is merely an example, which should not unduly limit the scope of the claims herein. A person having ordinary skill in the art would recognize many variations, alternatives, and modifications. The gateway 300 may be coupled to an external data source, such as high speed network, the World Wide Web, the internet, or an intranet via Ethernet ports 329. As shown, the gateway 300 includes a variety of elements. Such elements include a Central Processing Unit (CPU) 301 that is connected to a network switch chipset 303 through an Industrial Standard Architecture (ISA) interface to Ethernet interface 305. The CPU 301 is also connected to NAND flash memory 307, synchronous dynamic access memory (SDRAM) 309, a Secure Digital (SD) socket 311, a crystal 313 and five (5) universal asynchronous receiver/transmitter (UART) ports 317. Each UART port is connected to a variety of elements, such as a low-speed powerline chipset 319, a Zigbee wireless chipset 321, a Joint Test Action Group (JTAG) 323, a RS232 connector 325, and a USB connector 327. The network switch chipset 303 is connected to a plurality of Ethernet ports 329 and a high-speed powerline chipset 331 through a media independent interface (MII) interface 333. The backup battery module 335 is comprised of a DC converter 337 that connects to a reset circuit 339, a DC input 341 and a backup battery 343. The DC input 341 provides a powerline signal output 345. The reset circuit 339 provides a reset output 347.

Gateway 300 creates the networking infrastructure needed for connecting a variety of appliances, devices, controls, and sensors to the World Wide Web. Network infrastructure is created by high-speed powerline chipset 331, low speed powerline chipset 319, and or wireless chipset 321. Gateway 300 may support the HomePlug or ZigBee standards. Powerline chipsets 331 and 319 allow the use of existing electrical wiring for the provisioning of network infrastructure throughout premises wiring by implementing a modulated carrier signal on the wiring system. The carrier signal allows the transfer of data between the gateway 300 and various client devices connected to the powerline network. The powerline network may be further supported and extended by the deployment of appliance module 111, or various powerline routers, switches or signal amplifying devices along various points in the premises wiring layout. Wireless ZigBee chipset 321 allows the provisioning of the networking infrastructure across the airwaves via a radio frequency (RF) signal. The RF signal allows the wireless transfer of data between the gateway 300 and various devices on the network. The wireless network infrastructure may likewise be supported by appliance module 111, or various wireless routers, switches, or signal amplifying devices across the wireless coverage area.

Gateway 300 operates as a central host for the integrated powerline and wireless network that it provides. Other networking technologies rely on mesh-type network architectures in which multiple devices throughout the network act as repeaters in continually supporting network connectivity. However, in order for a mesh-type network to be successful, many devices are needed across the desired networking area in order to support the network. The preferred embodiment of the present system and method relies on a different approach. The gateway 300 is the central hosting device for integrated powerline and wireless network. The present system and method does not rely on many devices for supporting the network, the gateway 300 is the central host and supports network integration and connectivity.

Gateway 300 allows a data signal to be networked across the powerline infrastructure backbone to the preferred locale or specific premises location and thereafter networked across wireless infrastructure in order to reach a client appliance, device, or sensor. Gateway 300 supports the integration of powerline and wireless technology into a single local area network solution in order to increase network coverage and connectivity with a variety of client devices or appliances. Network data signals may be efficiently routed across both powerline and wireless media to areas supported by premises wiring or wireless infrastructure.

In using gateway 300 as a central controller of data signals across the network infrastructure, interference is eliminated from the system. Previous attempts at connecting client devices to network controllers utilized wireless or powerline technologies that were not centrally controlled. Each deployment of a wireless or powerline system in a multi-unit dwelling relied on separate devices and infrastructure to connect client devices to a controller. Interference between wireless and powerline technologies commonly occurs across multiple deployments of separate networking technology. With the use of the present system and method preferably embodied in gateway 300, interference is thereby eliminated as data signals are centrally provisioned, managed and controlled.

Coupling by gateway 300 to client devices is accomplished with powerline or wireless signal technology. Devices may also be coupled to gateway 300 through additional media such as coaxial cable, telephone cable, infrared signal, or other electromagnetic frequency. The data signal between gateway 300 and client devices may be via a range of bandwidths. A high-speed bandwidth signal may be used to transmit and receive large data content signals to client devices such as an IP camera, set-top box, printer, or other devices. A low-bandwidth signal may be used to transmit and receive low data content signals for use in measuring, monitoring, or controlling client devices on the network. For example, a low-bandwidth signal may carry command or control information from gateway 300 to appliance module 111 and turn the connected appliance on or off. Furthermore, the low-bandwidth signal may efficiently carry low data content signals containing power usage, consumption, or rate data information.

Coupling by gateway 300 to network infrastructure may be accomplished in a variety of architectures. The low-bandwidth signal may be generated by low-speed powerline chipset 319 and individually coupled to premises wiring at a certain location near gateway 300. Similarly, the high-speed bandwidth signal may be generated by high-speed powerline chipset 331 and individually coupled to premises wiring at a certain location near gateway 300. Wireless signals may be generated by ZigBee chipset 321 and coupled to client devices via RF signal and client device RF receiver. In an alternative method, gateway 300 may couple to network infrastructure through bridging wireless and powerline signals. For example, gateway 300 may generate a data signal, couple the signal to premises wiring via low-speed or high-speed powerline chipsets 319 or 331 respectively, and thereafter convert the powerline data signal to wireless signal at the desired location in the premises wiring and thus connect with client devices. Alternatively, a variety of combinations or bridging methods may be used to couple gateway 300 to client devices across network infrastructure via wireless to powerline or powerline to wireless signal media.

Coupling locations for gateway 300 may be embodied in individual locations for each chipset or alternatively in a single location. For example, low-speed powerline chipset 319 may couple to premises wiring at a specified location independent of the coupling location to premises wiring of high-speed powerline chipset 331. Alternatively, the coupling location for gateway 300 may be a single location, integrating low-speed and high-speed powerline signals. For example, data signals generated by gateway 300 and low-speed and high-speed powerline chipsets may be coupled to premises wiring with one coupler at a single location. Furthermore, coupling locations for sending or receiving data signals across premises wiring may be integrated or separate. For example, powerline chipsets 319 or 331 may be coupled to premises wiring in one location for transmitting powerline data signal and coupled to premises wiring in another separate location for receiving powerline data signals from network infrastructure. Alternatively, powerline chipsets 319 of 331 may be coupled to premises wiring at a single location for sending and receiving data signals.

Coupling of powerline chipsets 319 or 331 to premise wiring may be embodied in an AC/DC coupler integrated into the power supply unit or battery backup module 335 of gateway 300. As an embodiment of such integrated power supply and powerline chipset coupling, gateway 300 may be connected to a premises location AC power supply, such as a standard 120-volt wall outlet. In utilizing a 120-volt AC power source to supply electrical power to the gateway 300, an AC/DC coupler may additionally couple powerline chipsets 319 or 331 to the premises wiring via the same power source. Furthermore, the power supply unit of gateway 300 may provide the desired DC-voltages required by the variety of high-speed powerline, low-speed powerline, ZigBee, or other chipsets embodied in the system. It is known by persons having ordinary skill in the art that specific chipsets typically operate at particular DC-voltages which are essential for proper functioning. For example, high-speed powerline chipset may operate at 3.5 volts DC, whereas ZigBee chipset may operate at 12 volts DC. Thus, the power supply of gateway 300 may provide the particular voltages need by the chipsets utilized in the system.

The back-up battery module 335 and back-up battery 343 of gateway 300 allows operation of gateway 300 in the event of a power failure or disruption. During such an event, gateway 300 is able to continually operate uninterrupted via battery module 335 and back-up battery 343 in supplying a continuing source of power. Maintaining operational status of gateway 300 via back-up battery module 335 and back-up battery 343 allows gateway to continue to send and receive data signals across the network infrastructure to client devices. With back-up battery module 335 and back-up battery 343, gateway 300 is also able to maintain command or control of client devices on the network infrastructure. For example, in the event of a power failure, gateway 300 may continually operate in controlling the opening or closing of a client device door mechanism. This allows gateway 300 to maintain control or security over such a client device door mechanism and maintain security over entry ways into a premises location. In another embodiment, gateway 300 may maintain network infrastructure or continue to collect, aggregate, store, receive, or transmit data signals across the network infrastructure in the event of a power failure or disruption by utilizing back-up battery module 335 and back-up battery 343. Without normal power, gateway 300 may also continually send or receive data from a utility provider or company with back-up battery module 335 and back-up battery 343.

In the event of a power failure or power disruption, gateway 300 may enter a safe mode and may operate to conserve power in a low power mode. Additionally, non-essential operations of gateway 300, such as commanding or controlling premises lighting devices, may be shut down in order to conserve power available via the back-up battery module 335 and back-up battery 343. In a safe mode, gateway 300 may conserve power to by focusing command or control exclusively on security related client devices throughout the network infrastructure. An alert message may be generated by gateway 300 in low power or safe mode in response to a power event. Furthermore, operations to be performed by gateway 300 in safe mode or low power mode may also be scheduled or custom configured by the user.

Data is collected by gateway 300 from client devices via the network infrastructure through data signals. Data may include power usage information, such as instantaneous power, peak power, or average power. Such data may be collected from each client device on the network and aggregated at the gateway 300. The data may be stored on gateway 300 NAND flash memory 307 or synchronous dynamic access memory (SDRAM) 309 for later use. Gateway 300 may receive various data signals containing data from the network or client devices. Also, gateway 300 may transmit data via data signals across the network infrastructure to client devices.

Network media are bridged with gateway 300 as various types of data transmission methods may be used to communicate across the network infrastructure. Gateway 300 utilizes powerline technology to connect and communicate across premises wiring and gateway 300 utilizes radio frequency (RF) signals to communicate wirelessly. These media types are bridged with gateway 300 as a data signal may be bridged from powerline media to RF media in order to communicate to a client device. The data signal content may also be bridged across other different media types in order to communicate with client devices on the network. Gateway 300 may employ other network media or signal types to communicate or route data signals or content across powerline systems, HomePlug systems, copper wiring, premises wiring, co-axial cables, telephone cables, wireless technologies, RF signals, WiFi, ZigBee, Bluetooth, WPAN, RFID, UWB, infrared (IR), or other media. Gateway 300 bridges various network media in acting as a central controller for routing a data signal throughout the network infrastructure and across different network media.

Client devices are coupled to gateway 300 via the network infrastructure and thus communicate with gateway 300 by sending and receiving data signals across various bridged network media. For example, a client device may communicate wirelessly across a room in a building via ZigBee signal to appliance module 400 or a powerline coupler located nearby. Appliance module 111 or the powerline coupler then may convert the signal from wireless ZigBee medium to powerline signal and transmits the data across the powerline network to gateway 300. Additional couplers may convert data signals across different media types within the network infrastructure. Client devices may include a plurality of appliance modules 111, panel meters 113, serial bridges 115, network adapters 121, or a variety of sensors 123. Client devices may send and receive data signals via network infrastructure to gateway 300. Command or control signal data may be sent from gateway 300 via the network infrastructure to client devices.

In order to interact with gateway 300, remote or local computing devices may connect to gateway 300 via the World Wide Web, internet or via the network infrastructure. A computer or mobile device running client software applications may communicate with gateway 300 and send and receive data to client devices connected to the network infrastructure via gateway 300. Gateway 300 and the client devices connected to the network infrastructure may be monitored or controlled from anywhere in the world by a remote computing device. For example, a remote computing device may connect to gateway 300 via the internet and select a specific client device for adjustment of power usage or energy consumption. Additionally, remote computing devices may collect information or data stored on gateway 300 for processing or display on the graphical interface of the computing device. Remote computing devices may be server computers operated by utility companies and send or receive data from customer sites via gateway 300. Additionally, utility companies may send command or control data signals to customer gateways 300 in order to shut down client devices during times of peak power usage. Utility companies may furthermore, send energy pricing data to customer gateways 300 and customer energy usage may appropriately be configured or readjusted.

In generating a wireless signal for network infrastructure, gateway 300 may utilize a Zigbee wireless chipset 321. As preferred embodiment, the Zigbee chipset 321 can feature an integrated Zigbee chipset manufactured by EMBER CORPORATION of Massachusetts, according to an embodiment of the present invention, but it would be recognized that other chipsets could be utilized such as wireless chipsets for RF signals, WiFi, ZigBee, Bluetooth, WPAN, RFID, UWB, infrared (IR), or other media. In alternative embodiments, the Zigbee wireless chipset 321 can include other chipset designs that are suitable for the present methods and systems such as other Zigbee chipsets from suitable companies such as TI, Freescale, or others, as well as other wireless networking technologies that are suitable for the present methods and systems such as 6loWPAN, WiFi 802.11, Bluetooth, RFID, and UWB network chipsets from Archrock, Broadcom, Atheros, or others. As noted, the chipsets and companies mentioned are merely an example and should not unduly limit the scope of the claims herein.

As another embodiment of the present system, gateway 300 may utilize an integrated chipset for communicating or sending data signals across combined network media. As an example, low-speed powerline chipset 319, high-speed powerline chipset 331, and ZigBee chipset 321 may be embodied in a single chipset solution that generates data signals for gateway 300 in communicating with client devices across both powerline and wireless network media. Such a single chipset solution may generate powerline, wireless, or other signals in order to send and receive data across network infrastructure. A single chipset may offer an integrated solution for bridging different network media by gateway 300.

In generating a powerline signal for network infrastructure across premises wiring, gateway 300 may utilize a low-speed 319 or high-speed 331 powerline chipset. As a preferred embodiment, the powerline chipsets 319 or 331 may feature an integrated powerline chipset manufactured by YITRAN of Israel, according to an embodiment of the present invention, but it would be recognized that other chipsets could be utilized. Powerline chipsets 319 or 331 may be embodied in a variety of chipsets optimized for coupling and communicating across HomePlug systems, copper wiring, premises wiring, co-axial cables, or telephone cables within the network infrastructure managed by gateway 300. As a preferred embodiment, the powerline chipset 319 or 331 may be a single-chip powerline networking controller with integrated Simple serial Host interface (logical command language over UART). The chip interfaces with RS232 serial interfaces, among others. Preferably, there is at least a 7.5 kbps data rate on the premises wiring or AC wiring, although others may be desirable, such as 1 Mbps, 14 Mbps, 85 Mbps, 400 Mbps and 1 Gbps. In alternative embodiments, the powerline chipset 319 or 331 can include other chipset designs that are suitable for the present systems such as other powerline chipsets from suitable companies such as DS2, Intellon, Panasonic, Coppergate, Sigma, Arkados, Yitran, Echelon, or others, as well as other networking technologies that are suitable for the present methods and systems such as HomePNA, MoCA, and UWB network chipsets from Coppergate, Entropic, or others. As noted, the chipsets and companies mentioned are merely an example and should not unduly limit the scope of the claims herein.

Figure 4:
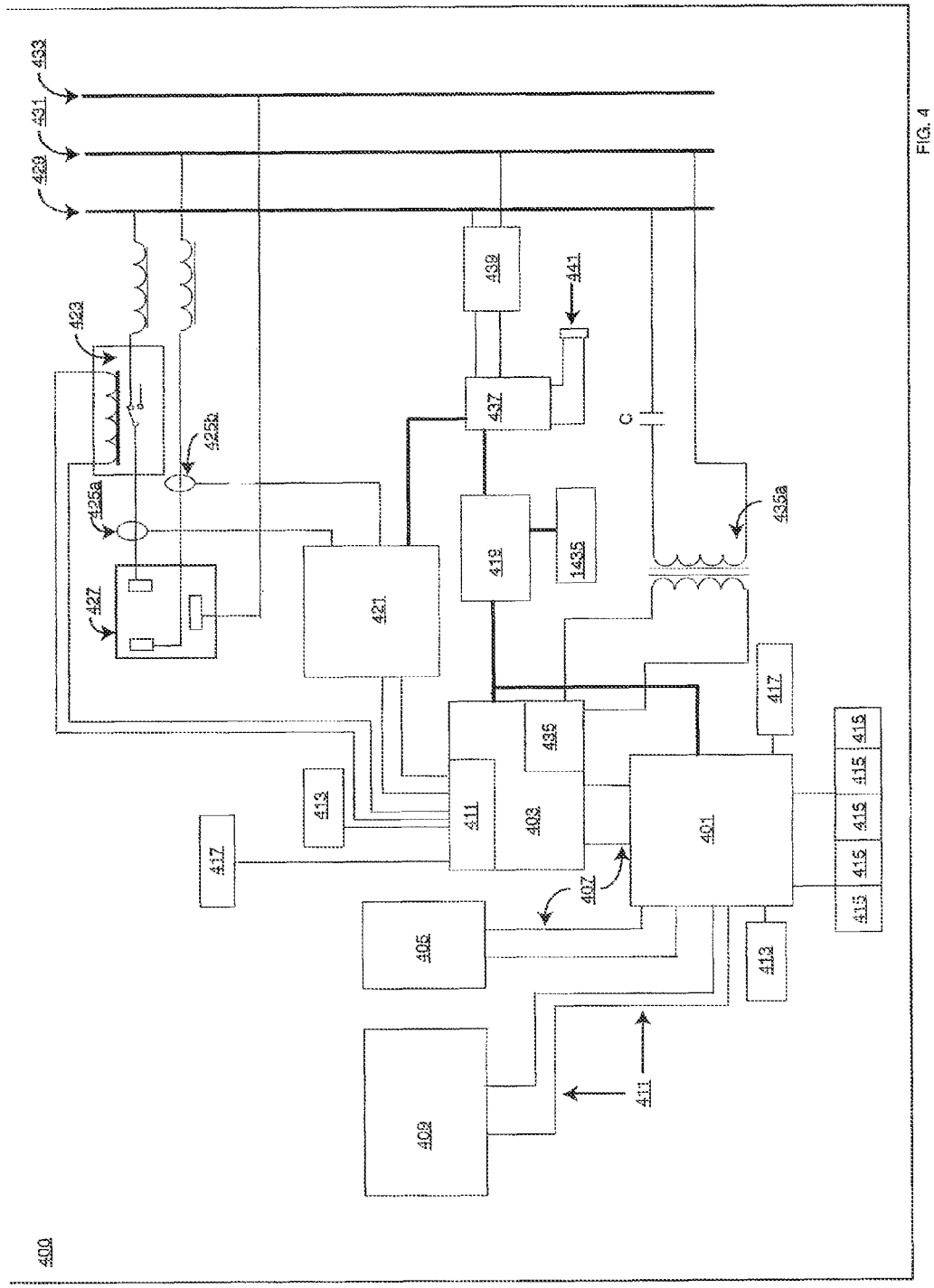
FIG. 4 is a simplified block diagram of the appliance module according to an embodiment in the present invention.

FIG. 4 is a simplified block diagram of the appliance module 400 according to an embodiment in the present invention. Appliance module 111 of FIG. 1 and 211 of FIG. 2 is shown in greater detail 400 in FIG. 4. This diagram is merely an example, which should not unduly limit the scope of the claims herein. A person having ordinary skill in the art would recognize many variations, alternatives, and modifications. As shown, the appliance module 400 includes a variety of elements. Such elements include a Central Processing Unit (CPU) 401 that is connected to a powerline chipset 403 and a Zigbee wireless chipset 405 through a RS232 serial interface 407. The CPU 401 is also connected to a temperature and humidity sensor 409 through an I/O port 411, a reset circuit 413, a plurality of General Purpose Input/Output (GPIO) ports 415, a crystal 417, and a backup power module 419. The powerline module 403 includes a variety of elements. Such elements include a plurality of I/O ports 411, an analog to digital interface 435 that connects to the live wire 429 and the neutral wire 431 through a coupling method 435a, and a backup power module 419. Each I/O port 411 is connected to a variety of sources. Such sources include a reset circuit 413, a crystal 417, a power measure module 421, a relay switch 423. The power measure module 421 is connected to a power supply 437 and two (2) current transformers (CT) 425a and 425b that are connected to a standard AC socket 427. The AC socket 427 is plugged directly onto the AC wiring. AC wiring has three wires which include, a live wire 429, a neutral wire 431 and a ground wire 433. One CT 425a measures current on the live wire 429 and the other CT 425b measures current leakage on the neutral wire 431. The backup power module 419 includes a variety of elements. Such elements include a battery 1435, and a power supply 437. The power supply 437 also includes a variety of elements. Such elements include an EMI Filter 439 and a 12V 500 mA DC output 441. The EMI Filter 439 is connected to the live wire 429 and the neutral wire 431.

A preferred embodiment of appliance module 400 is a device which can connect to a variety of appliances or devices and measure, store or control energy usage of each appliance or device. Appliances or devices may include client devices on the network infrastructure such as refrigerators, washer and dryers, ranges, stoves, microwaves, personal computers, televisions, or others. As an example of appliance module placement, appliance module 400 may sit between a client device and a standard wall electrical outlet. Specifically, appliance module 400 may be embodied as a device which may be plugged into an electrical outlet and provide and simultaneously provide an outlet to a certain client device. By plugging the client device into the outlet of appliance module 400, the client device is able to obtain electrical power and the appliance module is able to take measurements of energy usage.

Appliance module 400 may couple to client devices remotely or locally. For example, appliance module 400 may measure or manage energy consumption of a client device directly coupled to it by plugging such client device directly into the appliance module. Alternatively, appliance module 400 may remotely measure or manage energy consumption of client devices via remote coupling through network infrastructure. For example, appliance module may couple to client devices via wireless or ZigBee signal.

Appliance module 400 may provide the network infrastructure to support connectivity between gateway 300 and client devices. Typically, an appliance module 400 may be placed at the terminal end point of premises wiring. Gateway 300 sends and receives powerline signals across the premises wiring system in order to communicate with appliance module 400. As appliance module is coupled to the premises wiring, it may send and receive powerline signals to gateway 300. Furthermore, appliance module 400 may communicate to client devices wirelessly via RF signal past the premises wiring system. The powerline data signal sent between appliance module 400 and gateway 300 may be further transmitted by appliance module 400 as a wireless RF signal. Additionally, other signal media may be used by appliance module 400 in communicating past the premises wiring system such as other wireless technologies, WiFi, ZigBee, Bluetooth, WPAN, RFID, UWB, infrared (IR), or other media.

In bridging various wireless network media to powerline or other premises wiring networking technology, appliance module 400 functions to provide a network backbone across premises wiring and allows wireless connectivity to such network backbone. Appliance module 400 enhances the coverage and range of ZigBee or wireless network infrastructure by providing a bridge to the premises wiring network backbone. Previously un-connected client devices may be coupled to the network via appliance module 400. Client devices may be ordinary household appliance which may not generate unique data signals or provide unique command or control interfaces, such as existing premises lighting, HVAC systems, or television. However, some client devices may be specifically designed for coupling to appliance module 400 for command or control by gateway 300. In all instances, appliance module 400 provides the bridging capability to connect client devices to the network infrastructure.

Data measured by appliance module 400 as a preferred embodiment includes power usage information, such as instantaneous power, peak power, or average power. Such data may be collected from each client device connected to appliance module 400 via network infrastructure, or specifically via local or remote coupling to client devices as described above. Appliance module 400 sends such data to gateway 300 via network infrastructure. Data provided by appliance module 400 may be used for determining energy footprint, energy efficiency, sources of energy waste, levels of consumption, energy cost, or carbon footprint. Appliance module 400 may also be used for determining or locating client devices responsible for "vampire" current and how much such leaks cost.

Command or control of client devices may be provided by appliance module 400. Basic on or off switching of client devices may be supported by appliance module 400. Typically, basic command or control signals, or other data measurements from client devices coupled to appliance module 400 may be low-bandwidth data signals. Additionally, appliance module 400 may support a high-bandwidth data signal to client devices in order to provide a variety of command or control functionality. As an example, a client device may be a set-top box coupled to appliance module 400. A high-bandwidth data signal may be communicated across network infrastructure via gateway 300 to appliance module 400, which may be coupled to set-top box. In another embodiment, a client device may be an IP camera coupled to an appliance module. The IP camera may generate a high-bandwidth data signal which may be transmitted by appliance module 400 across network infrastructure to a desired location or received by gateway 300.

Figure 5:
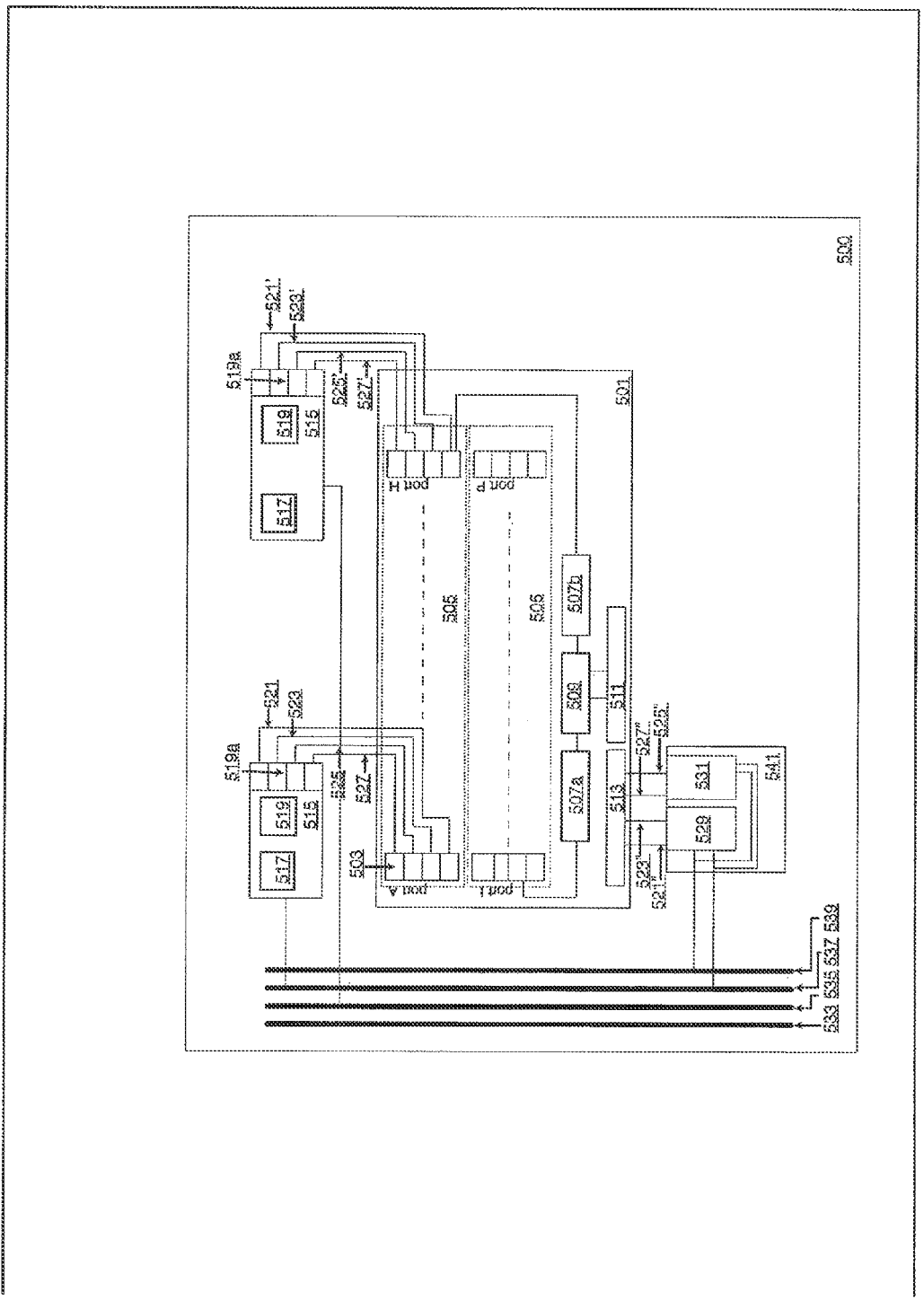
FIG. 5 is a simplified block diagram of the circuit meter according to an embodiment in the present invention.

FIG. 5 is a simplified block diagram of the panel meter apparatus 500 according to an embodiment in the present invention. Panel meter 500 is a more detailed view of panel meter 113 or 213 of FIGS. 1 and 2 respectively. This diagram is merely an example, which should not unduly limit the scope of the claims herein. A person having ordinary skill in the art would recognize many variations, alternatives, and modifications. As shown, the panel meter apparatus 500 includes a variety of elements. Such elements include a panel meter module 501, a plurality of circuit connectors 503 that is group together 505, a plurality of current sensor modules 515, and a power supply unit 541. The panel meter module 501 includes of a variety of elements. Such elements include a plurality of CPUs 507a, 509, and 507b that are connected to a plurality of circuit connectors port A 503, port I 505, port P, and port H. CPUs 507a and 507b read data from the plurality of circuit connectors. The master CPU 509 collects the data from the CPUs 507a and 507b. Master CPU 509 is coupled to powerline chipset module 511 for sending and receiving data across the powerline network. The powerline chipset module 511 is further coupled to power input wires 521, 523, 525 and 527 connected to the power supply unit 541. Note that for multiple powerline modules, such power input lines 521, 523, 525 and 527, are shown numbered correspondingly as 521', 523', 525' and 527', and 521", 523", 525" and 527". The power supply unit is comprised of an AC/DC converter 529 and a 1:1 voltage transformer 531 and coupled to premises wiring 533, 535, 537, and 539. Premises wiring is comprised of a phase 1 wire 533, a phase 2 wire 535, a phase 3 wire 537 and a ground or neutral wire 539 in an electrical circuit breaker panel or distribution panel. Circuit connectors port A 503, port I 505, port P, and port H are connected to current sensor modules 513 via a four-wire design 521, 523, 525, and 527. The four-wire design is comprised of a constant voltage 521, a ground wire 523, an energy signal output 525 and a reference voltage input 527. Current sensor modules 515 are comprised of a current sensor 517 and an energy monitoring integrated circuit (IC) 519.

Panel meter 500 may be comprised of circuit connectors 1 through N, shown in FIG. 5 for illustration purposes as circuit connectors port A 503, port I, port P, and port H. It is understood that panel meter 500 may include more or less circuit connectors than depicted in FIG. 5. Panel meter 500 may further comprise a plurality of current sensor modules 1 through N, shown in FIG. 5 for illustration purposes as current sensor modules 515. It is understood that panel meter 500 may include more or less current sensor modules than depicted in FIG. 5. Current sensor modules are coupled to each circuit connector and premises wiring to allow the measurement of energy consumption data. Panel meter 500 may further comprise a plurality of CPUs 1 through N, shown in FIG. 5 for illustration purposes as CPUs 507a and 507b. It is understood that panel meter 500 may include more or less CPUs than depicted in FIG. 5. Master CPU 509 collects data from the plurality of CPUs in panel meter 500.

Panel meter 500 may function with a single or a plurality of current sensor modules 515, thus making the design modular. With a single panel meter, a user may select a given number of desired current sensor modules and plug each current sensor module into the panel meter 500. The panel meter 500 is not restricted to a fixed number of current sensor modules 515. A user may increase or decrease the amount of current sensor modules 515 at any given time.

Panel meter 500 comprises a compact design for easy installation near a circuit breaker or distribution panel. The space-saving design is user-friendly and eases installation into sometimes cramped spaces around circuit breakers or distribution panels.

Panel meter 500 provides similar functionality as with appliance module 400 in regards to measuring energy usage data. However, panel meter 500 takes energy measurements in a different manner than appliance module 400. Panel meter 500 takes energy measurements at an electrical circuit breaker panel or distribution panel 125 or 225, in contrast to appliance module 400 which takes measurements between a client device and a power source. As a preferred embodiment, panel meter 500 may be installed in or near to an electrical circuit breaker panel or distribution panel 125 or 225 of a premises electrical power system. With installation near a circuit breaker panel or distribution panel, panel meter 500 measures energy consumption data across circuits in an electrical circuit breaker panel or distribution panel 125 or 225. The isolation of premises wiring into circuit segments with circuit breakers may vary depending on the electrical schematics of the particular location. Therefore, panel meter 500 may measure a variety of circuit segments depending on the particular electrical schematics of the location.

Panel meter 500 may be embodied with plurality of current sensor modules 515 which may be coupled to premises wiring circuits in or near electrical circuit breaker panel or distribution panel 125 or 225. For example, a current sensor modules 515 may be connected to the circuit wiring supporting the kitchen lighting as designated in the electrical circuit breaker panel or distribution panel. Additional current sensor modules 515 may be connected to the circuits represented in the electrical circuit breaker panel or distribution panel, such as a circuit for the downstairs bathroom, garage, upstairs bedroom, living room, etc., or other circuit designations or layouts.

A preferred embodiment of current sensor modules 515 may be a current clamp device or probe which clamps around a premises wiring circuit or segment in the electrical circuit breaker panel or distribution panel. An alternative embodiment of current sensor modules 513 may be a current loop device where a segment of premises wiring is threaded through the loop of the current sensor module. In all embodiments of current sensor modules 515, the design will allow easy installation to the electrical circuit breaker panel or distribution panel and provide measurements of power usage information, such as instantaneous power, peak power, or average power.

Panel meter 500 may be adapted to measure or store energy consumption information of one, two or three phases of power. For example, current sensor modules 515 may be embodied in a current clamp or current loop device coupled to phase 1 wire 533, a phase 2 wire 535, a phase 3 wire 537 and a ground or neutral wire 539 and provide these measurements to panel meter 500. Alternatively, other phase combinations of power measurements may be accomplished by panel meter 500.

Current sensor modules 515 may also be preferably embodied in a current clamp or loop device which may transmit data signals into the premises wiring circuits and thus into the powerline network. Data signals from panel meter 500 may be sent into the network infrastructure via powerline chipset module 511. Panel meter 500 may transmit data to a variety of client devices or gateway 300 through network infrastructure via powerline chipset module 511.

Panel meter 500 may support the HomePlug powerline networking standard in providing phase and circuit based energy measurement. In utilizing powerline chipset module 511 coupled to premises wiring, panel meter 500 may communicate, send or receive data with gateway 300 and other client devices connected to network infrastructure. Additionally, panel meter 500 may receive command or control signals from gateway 300 over the powerline network or network infrastructure. In communicating with gateway 300, panel meter 500 may exploit the full capabilities of networking infrastructure maintained by the gateway, such as powerline technologies over premises wiring, or wireless technologies, such as ZigBee.

Measurements may be provided by panel meter 500 in real-time or stored over time. With panel meter 500 communicating with gateway 300, data measurements from the electrical circuit breaker panel or distribution panel may be collected and graphically displayed via computing devices connected to gateway 300 via the World Wide Web or network infrastructure.

A backup power module option and battery may allow operation of panel meter 500 in the event of a power failure or disruption. During such an event, panel meter 500 is able to continually operate uninterrupted via power module option and battery in supplying a continuing source of power. Maintaining operational status of panel meter 500 via power module option and battery allows panel meter to continue to send and receive data signals across the network infrastructure to gateway 300 or client devices. In another embodiment, panel meter 500 may maintain network infrastructure or continue to collect, aggregate, store, receive, or transmit data signals across the network infrastructure in the event of a power failure or disruption by utilizing power module option and battery.

In the event of a power failure or power disruption, panel meter 500 may enter a safe mode and may operate to conserve power in a low power mode. Additionally, non-essential operations of panel meter 500, such as measuring non-essential data types or circuit segments, may be shut down in order to conserve power available via power module option and battery. An alert message may be generated by panel meter 500 in low power or safe mode in response to a power event. Furthermore, operations to be performed by panel meter 500 in safe mode or low power mode may also be scheduled or custom configured by the user.

Figure 6:
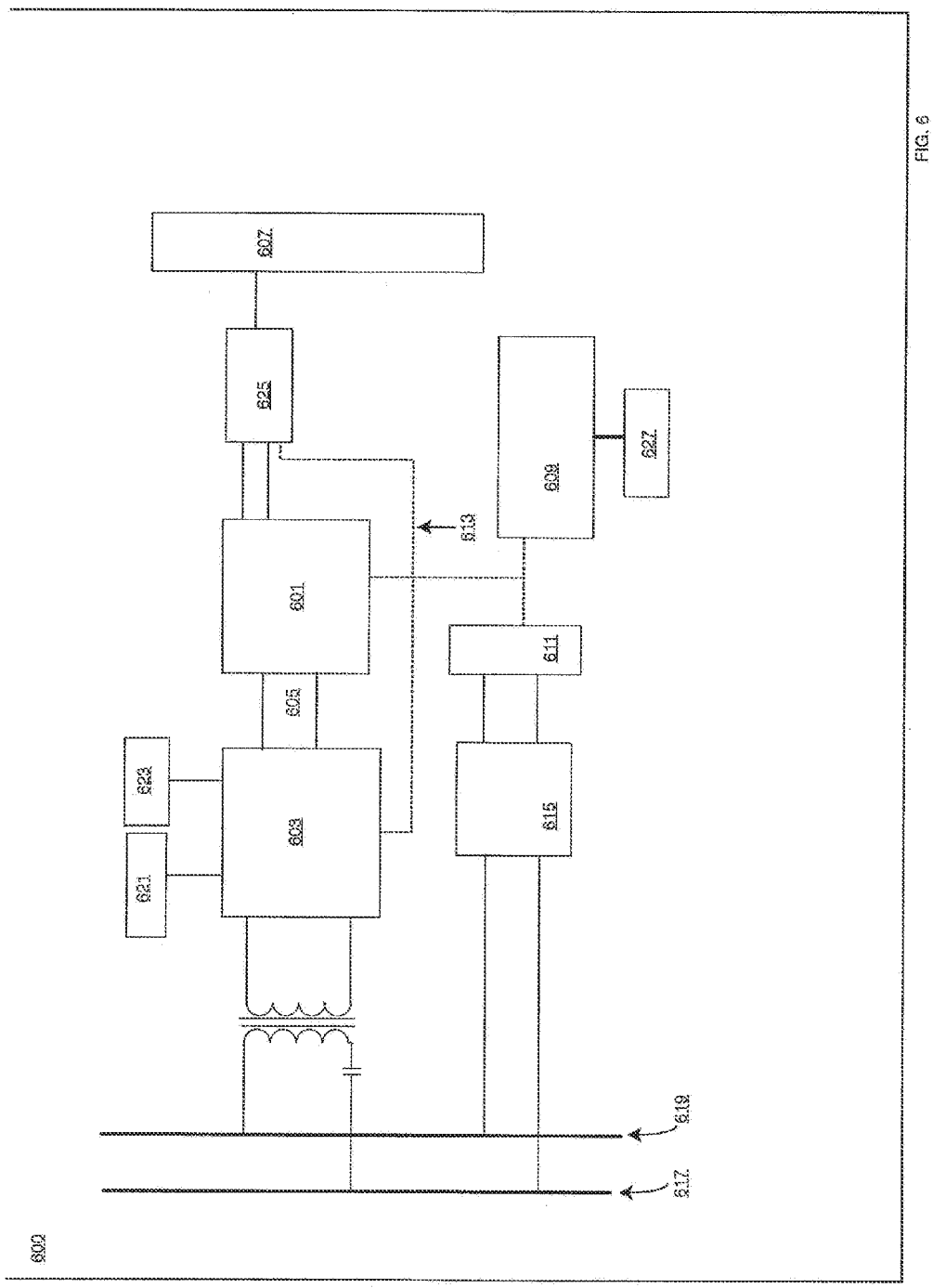
FIG. 6 is a simplified block diagram of the RS232 Bridge according to an embodiment in the present invention.

FIG. 6 is a simplified block diagram of the RS232 serial bridge 600 according to an embodiment in the present invention. This diagram is merely an example, which should not unduly limit the scope of the claims herein. A person having ordinary skill in the art would recognize many variations, alternatives, and modifications. As shown, the RS232 serial bridge 600 includes a variety of elements. Such elements include a Central Processing Unit (CPU) 601 that is connected to a powerline module 603 through a RS232 interface 605, and a RS232 connector 607 through a signal level conversion module 625. The CPU 601 is also connected to a backup power module option 609 and a power supply unit (PSU) 611 through a power bus 613. The PSU 611 includes a variety of elements. Such elements include an EMI filter 615 that is coupled to a live wire 617 and a neutral wire 619 of the AC wiring. The backup power module option 609 includes a variety of elements. Such elements include a battery 627. The powerline module 603 includes a variety of elements. Such elements include a crystal 621, a reset circuit 623, and a coupler that couples to a live wire 617 and a neutral wire 619 of the AC wiring.

A preferred embodiment of RS232 serial bridge 600 is in connecting legacy serial based devices to the HomePlug enabled powerline network across premises wiring as provided by gateway 300. RS232 serial bridge 600 may support RS232 based serial devices via DB9 serial port. RS232 serial bridge 600 may convert Modbus ASCII/RTU into Modbus TCP standards. For example, RS232 serial bridge 600 may connect a variety of gas, electric or water meters 127, solar power inverters 129, programmable controllable thermostats (PCT) 117, or other devices to the powerline network or networking infrastructure. RS232 serial bridge 600 provides connectivity to sensors, controllers, and other devices used for remote monitoring, energy management and control. Any device with a serial port, such as security systems or devices, point-of-sale (POS) systems, or home and building automation systems, to easily encapsulate serial data and transport it over network infrastructure to gateway 300 or client devices.

RS232 serial bridge 600 may also connect and send or receive data across other networking media via the networking infrastructure provided by gateway 300. Various client devices may connect to RS232 serial bridge 600 via powerline network or other media in the network infrastructure.

Figure 7:
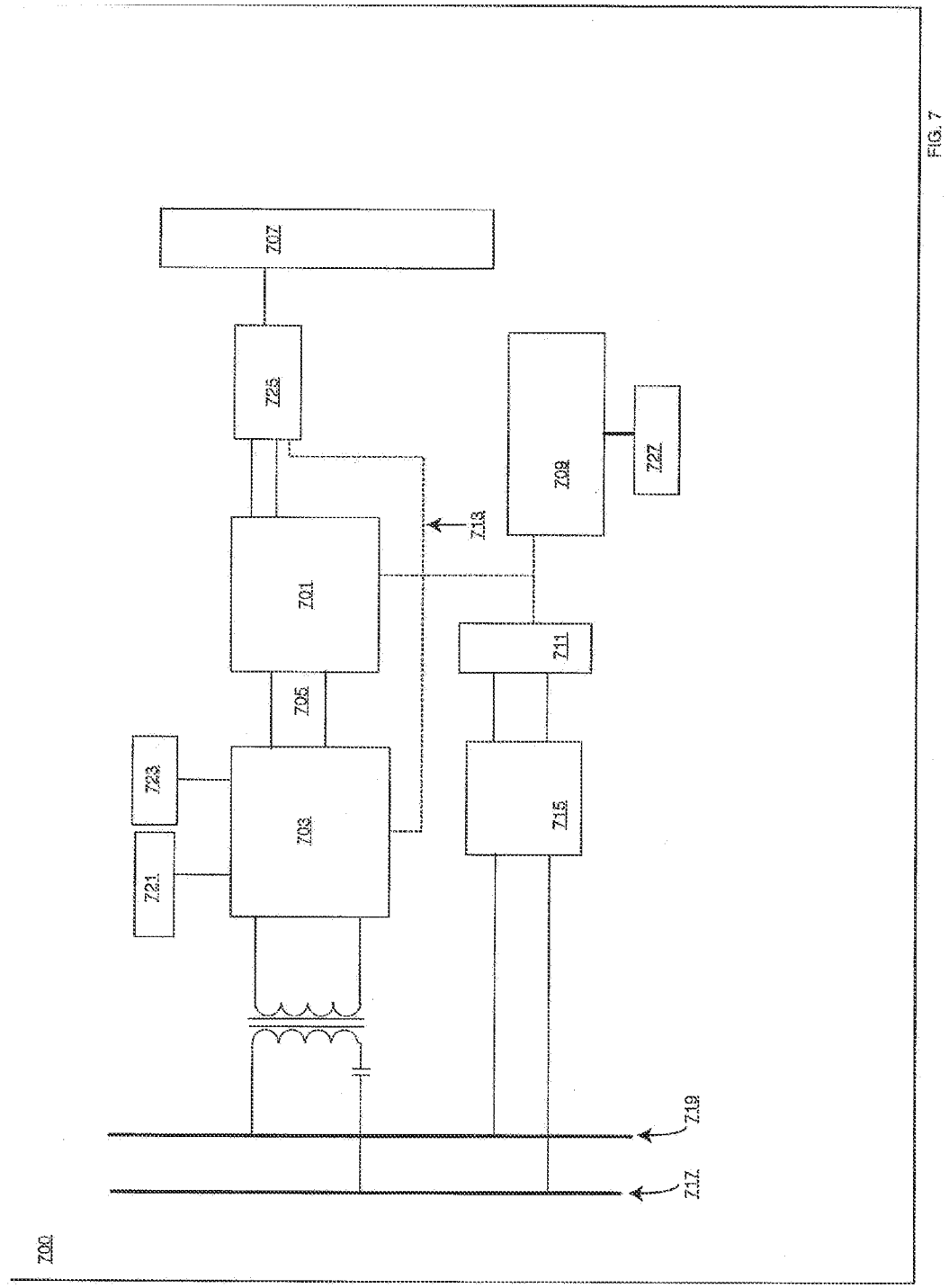
FIG. 7 is a simplified block diagram of the RS485 Bridge according to an embodiment in the present invention.

RS232 serial bridge 600 may preferably by embodied in a small form factor design with a status LED indicator. RS232 serial bridge 600 may provide connectivity without utilizing serial wires and supports easy installation of legacy serial based devices to the networking infrastructure provide by gateway 300. FIG. 7 is a simplified block diagram of the RS485 serial bridge 700 according to an embodiment in the present invention. This diagram is merely an example, which should not unduly limit the scope of the claims herein. A person having ordinary skill in the art would recognize many variations, alternatives, and modifications. As shown, the RS485 serial bridge 700 includes a variety of elements. Such elements include a Central Processing Unit (CPU) 701 that is connected to a powerline module 703 through a RS485 interface 705, and a RS485 connector 707 through a signal level conversion module 725. The CPU 701 is also connected to a backup power module option 709 and a power supply unit (PSU) 711 through a power bus 713. The PSU 711 includes a variety of elements. Such elements include an EMI filter 715 that is coupled to a live wire 717 and a neutral wire 719 of the AC wiring. The backup power module option 709 includes a variety of elements. Such elements include a battery 727. The powerline module 703 includes a variety of elements. Such elements include a crystal 721, a reset circuit 723, and a coupler that couples to a live wire 717 and a neutral wire 719 of the AC wiring.

A preferred embodiment of RS485 serial bridge 700 is in connecting legacy serial based devices to the HomePlug enabled powerline network across premises wiring as provided by gateway 300. RS485 serial bridge 700 may support RS485 based serial devices. RS485 serial bridge 700 may convert Modbus ASCII/RTU into Modbus TCP standards. For example, RS485 serial bridge 700 may connect a variety of gas, electric or water meters 127, solar power inverters 129, programmable controllable thermostats (PCT) 117, or other devices to the powerline network or networking infrastructure. RS485 serial bridge 700 provides connectivity to sensors, controllers, and other devices used for remote monitoring, energy management and control. Any device with a serial port, such as security systems or devices, point-of-sale (POS) systems, or home and building automation systems, may be connected to RS485 serial bridge 700 to easily encapsulate serial data and transport it over network infrastructure to gateway 300 or client devices.

RS485 serial bridge 700 may also connect and send or receive data across other networking media via the networking infrastructure provided by gateway 300. Various client devices may connect to RS485 serial bridge 700 via powerline network or other media in the network infrastructure.

RS485 serial bridge 700 may preferably by embodied in a small form factor design with a status LED indicator. RS485 serial bridge 700 may provide connectivity without utilizing serial wires and supports easy installation of legacy serial based devices to the networking infrastructure provide by gateway 300.

Figure 8:
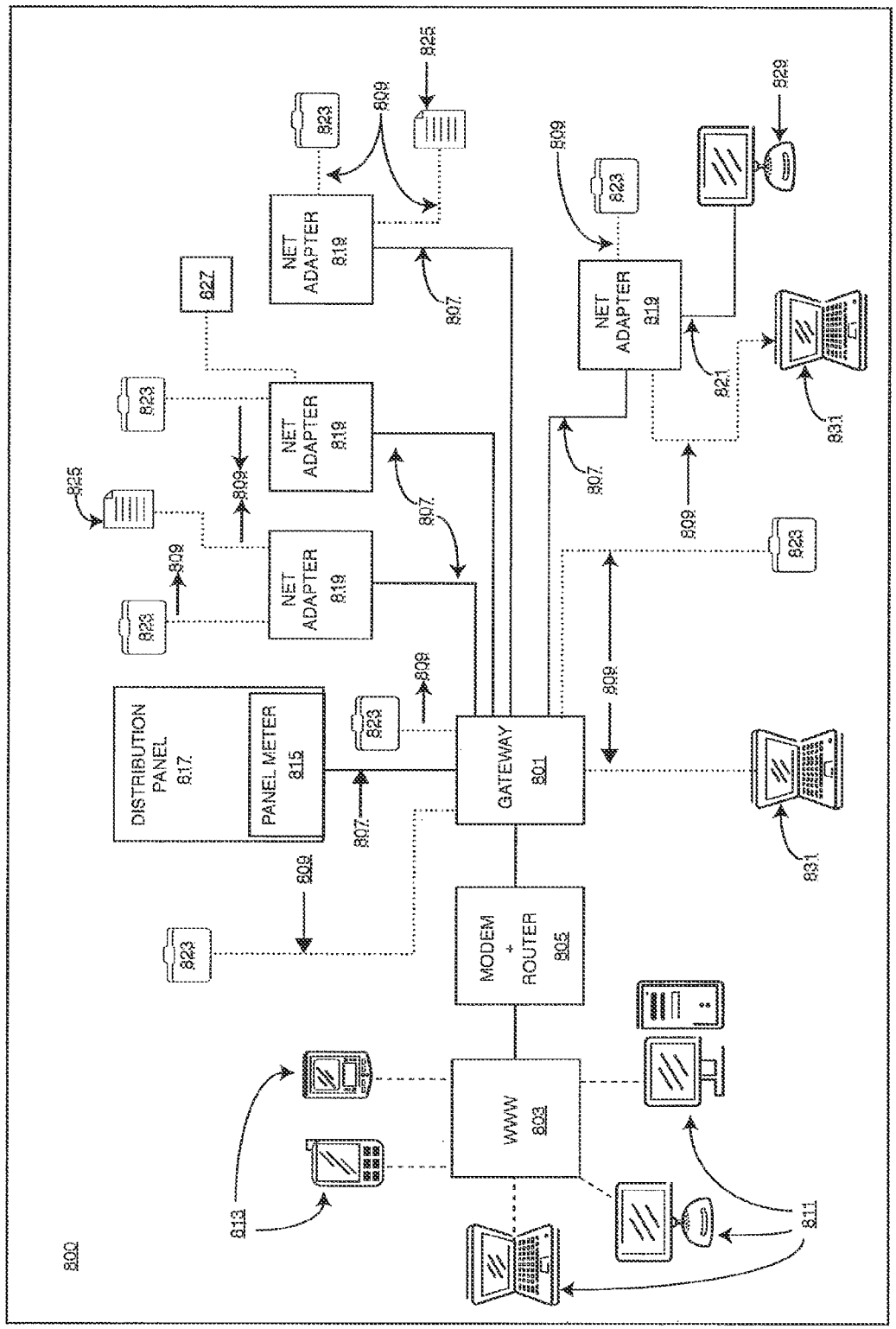
FIG. 8 is a simplified block diagram illustrating the present invention as deployed in an alternative business application such as a document control system.

FIG. 8 is a simplified block diagram illustrating the present invention as deployed in a document control system. This diagram is merely an example, which should not unduly limit the scope of the claims herein. A person having ordinary skill in the art would recognize many variations, alternatives, and modifications. As shown, the system 800 for a document control system is included. The system 800 has a gateway 801 that is coupled to the external data source 803, which is derived from a modem or router 805 that connects to the world-wide network of computers or world-wide web (WWW) 803 and provides multiple IP address to the system 800, and is then coupled to a plurality of client devices through AC wiring 807 or wirelessly 809. A plurality of computing devices 811 and mobile devices 813 can monitor and control the gateway 801 and client devices residing behind the gateway. The gateway 801 is adapted to collect, aggregate, store, receive and transmit information, and is also adapted to bridge various network media together. The gateway 801 is adapted to bridge low speed and high-speed powerline technologies and RFID wireless technology together. In alternative embodiments, wireless technology can include other wireless technologies such as wireless 802.11 standards, Zigbee, Zwave, 6lowPAN, or others. A panel meter 815 is adapted to inject and couple IP signal into up to three (3) electrical phases and into individual circuits residing in the distribution panel 817. The panel meter 815 is adapted to receive and transmit information. A network adapter 819 is an apparatus adapted to convert the signal from AC wiring 807 to an IP Ethernet signal 821 or a wireless signal 809 and can receive and transmit information. Each folder 823, document 825, and other assets 827 has a RFID wireless tag that connects to the gateway 801 and the network adapter wirelessly 809. Each folder 823, document 825, and other assets 827 can then be monitored and tracked anywhere on the network on a computing workstation 829 connected through a network adapter 819 over the AC wiring 807 or on a laptop 831 connected wirelessly 809 through the gateway 801 or through a network adapter 819. A plurality of computing devices 811 and mobile devices 813 can monitor and track each folder 823, document, 825, and other assets 827 through the WWW 803 that is connected to the gateway 801.

A preferred embodiment of a document control system 800 as illustrated in FIG. 8 may be an application in hospitals. In a hospital various patient medical records and files are constantly being transported to various locations within the premises. It is common for documents become lost or unable to be located quickly. Therefore, document control system 800 may be applied in order to solve the document control problem. Hospital records and files may be attached with RFID wireless tags that allow connectivity to network infrastructure and ultimately gateway 801. Each folder 823, document 825, or other assets 827 in a hospital application may have an RFID wireless tag that connects to the gateway 801 and the network adapter wirelessly 809.

For example, RFID wireless tag attached to a document may emit an RF signal which may be received by a network adapter 819 or other receiver configured for RFID signals. Typically, a network adapter 819 or other receiver will be located near the RFID tag attached to a document. Network adapter 819 or other receiver may then utilize the powerline network backbone, wireless network, or other network infrastructure to send RFID signal data to gateway 801. In receiving RFID signal, gateway 801 then is able to pinpoint the location or other data information provided by RFID signal. Thus, each folder 823, document 825, and other assets 827 can then be monitored and tracked anywhere on the network or premises location on a computing workstation 829 connected through a network adapter 819 over the AC wiring 807 or on a laptop 831 connected wirelessly 809 through the gateway 801 or through a network adapter 819. A plurality of computing devices 811 and mobile devices 813 can monitor and track each folder 823, document, 825, and other assets 827 through the WWW 803 that is connected to the gateway 801.

The forgoing illustration of a document control system 800 may be one preferred application of the technology. Further applications are available with the present invention, such as library asset management, retail environments, warehousing or stocking applications, manufacturing environments, office applications, or other environments that require tracking or control of objects capable of supporting RFID technology.

Figure 9:
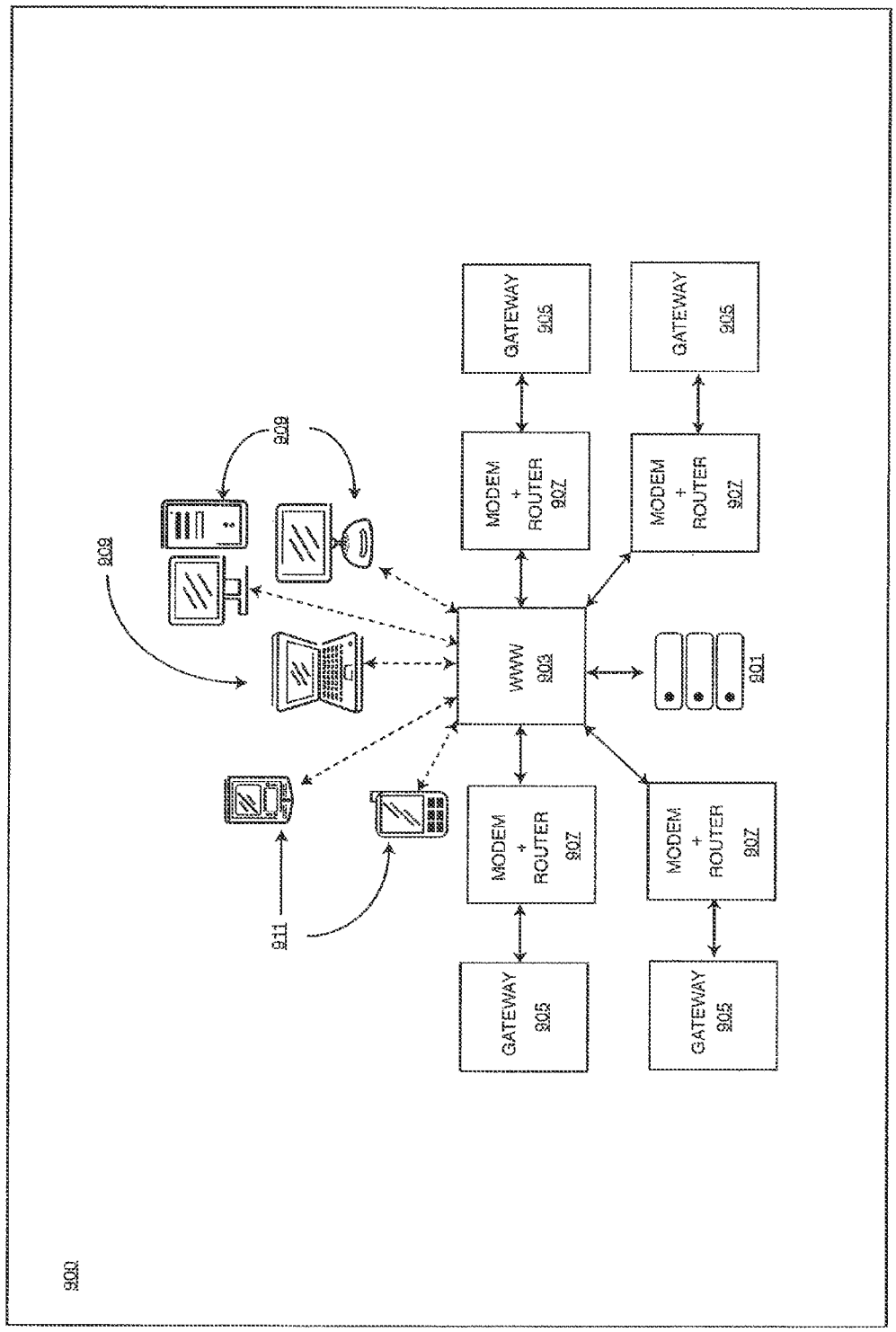
FIG. 9 is a simplified block diagram illustrating the remote management server as deployed in a plurality of locations according to an embodiment in the present invention.

FIG. 9 is a simplified block diagram illustrating the remote management system 900 as deployed in a plurality of locations according to an embodiment in the present invention. This diagram is merely an example, which should not unduly limit the scope of the claims herein. A person having ordinary skill in the art would recognize many variations, alternatives, and modifications. As shown, the remote management system 900 has a management server 901 that is connected to the world-wide networks of computers or world-wide web (WWW) 903. Through the WWW 903, the management server 901 may monitor, collect, store, manage, and control a plurality of gateways 905 that is connected to a modem or router 907. A plurality of remote computing devices 909 and mobile devices 911 can monitor, manage and control devices residing behind a gateway 905 via the management server 901 through the WWW 903.

Remote management system 900 may allow a utility or other service provider to collect data from customer gateways 905 and compile data regarding individual or entire customer energy usage data. Utility or other service provider may furthermore utilize remote management system 900 to command or control customer gateway 905 and thus connected customer client devices. For example, during peak power usage periods where blackouts or brownouts are expected, utility or service provider may command or control customer gateway 905 in order to shut down client devices and thereby reduce system power loads.

Remote management system 900 may allow a utility or service provider to send data regarding pricing fluctuations to customer gateway 905 and interact with customer settings related to power pricing levels. For example, customer may configure gateway 905 to operate based upon price levels provided by utility or service provider. Customer may configure gateway 905 to command or control client devices based upon energy prices. If prices are high, gateway 905 may therefore shut down non-essential client devices. For example, client device washer and dryer may be scheduled to operate only during non-peak price levels as the need to run the appliances may not be immediate and may be scheduled over a period of time. If prices are low, gateway 905 may perform scheduled operations via client devices that were not needed to be performed when prices were high. Therefore, gateway 905 may perform command or control of client devices efficiently scheduled in response to energy pricing data provided by utility or service provider via remote management system 900.

Figure 10:
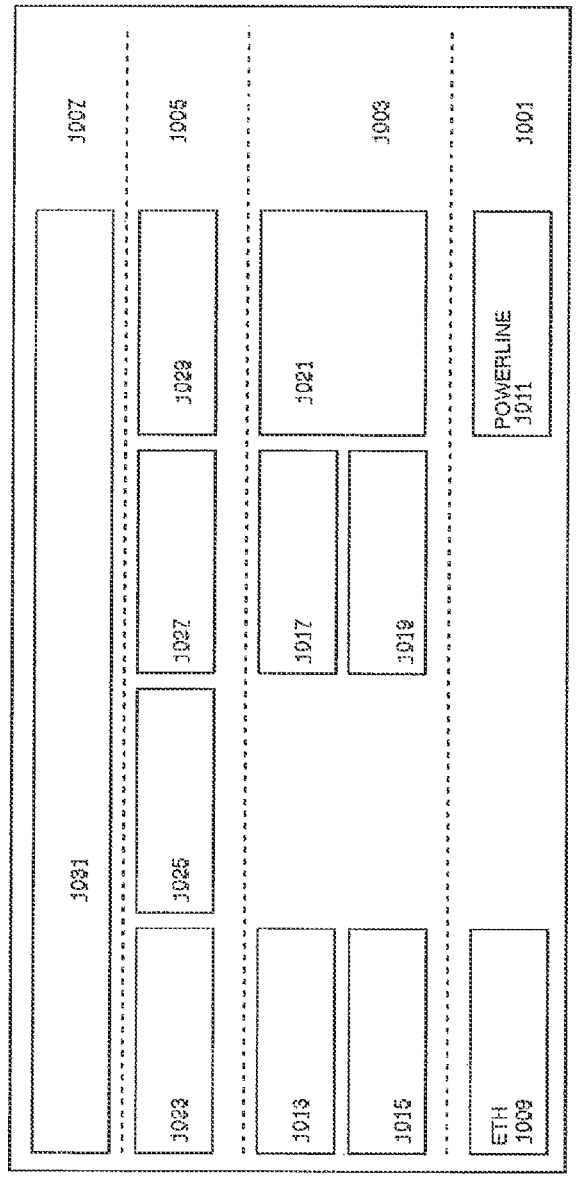
FIG. 10 is a simplified software block diagram for the gateway according to an embodiment in the present invention.

FIG. 10 is a simplified software block diagram 1000 for the gateway according to an embodiment in the present invention. This diagram is merely an example, which should not unduly limit the scope of the claims herein. A person having ordinary skill in the art would recognize many variations, alternatives, and modifications. As shown, the gateway software block diagram includes a variety of elements. Such elements include a physical layer 1001, a driver layer 1003, an application layer 1005 and a user interface layer 1007. The physical layer 1001 includes a variety of elements. Such elements include an Ethernet interface 1009 and a powerline Interface 1011. The driver layer 1003 includes a variety of elements. Such elements include a serial port driver 1013, an Ethernet driver 1015, a Zigbee driver 1017, a memory driver 1019, and a powerline driver, 1021. The application layer 1005 includes a variety of elements. Such elements include a data collection driver 1023, a command and control driver 1025, a data analysis and storage driver 1027 and a command communication driver 1029. The user interface includes a user interface 1031.

The software for the gateway represented in the block diagram of FIG. 10 may perform a variety of functions. Such gateway software may allow gateway to create an integrated powerline and wireless networking infrastructure. For example, gateway software may send a data signal across the powerline network backbone to a preferred location in the premises wiring. Thereafter, gateway software may support the conversion of the data signal into a wireless signal to be networked across wireless infrastructure. Gateway software may further efficiently route data signals across the integrated network in order improve network functionality. For example, gateway software may route data signals in a certain manner in order to improve data bit rate, or gateway may route data signals in order to conserve power.

Gateway software may allow the elimination of signal interference from the integrated network. The gateway software may act to centrally manage data packets or hash function in eliminating interference. Gateway software may centrally manage the provisioning of data signal frequencies and eliminate interference.

Gateway software may manage the coupling architecture of client devices to network infrastructure. For example, gateway software may control the type of bandwidth signal used to couple client devices. Furthermore, gateway software may also control the utilization of chipsets in generating data signals across powerline, wireless, or other network media. Gateway software may control the bridging architecture of the integrated network in bridging wireless and powerline signals. For example, gateway software may optimize the location and format for bridging various media types across the integrated network. In this functionality, gateway software may determine to utilize powerline networking in a certain location with poor wireless performance and vice versa use wireless networking where powerline performance is poor.

Backup battery module functionality of gateway may be controlled with gateway software. The software may allow gateway to perform backup function in the event of a power failure or disruption. The gateway software may be configured to maintain security in the even of a power failure and focus resources on the attainment of that goal. Alternatively, gateway software may optimize gateway performance to efficiently conserve power in the event of a power failure. Gateway software may allow safe mode operation to conserve power. The software may efficiently command or control client devices in response to a power loss event. Alert message generation may be controlled by gateway software.

Figure 11:
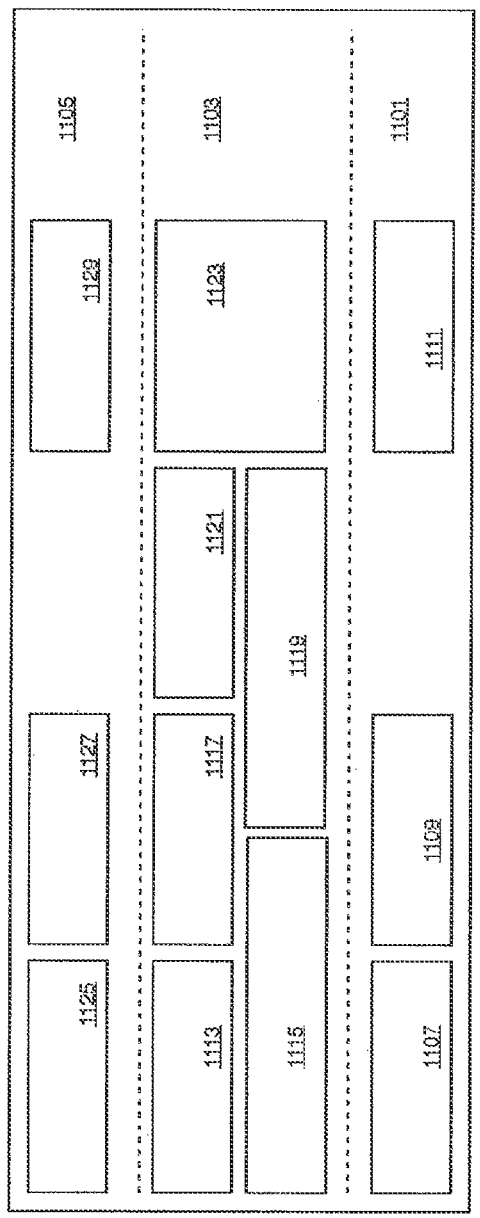
FIG. 11 is a simplified software block diagram for the appliance module according to an embodiment in the present invention.

FIG. 11 is a simplified software block diagram 1100 for the appliance module according to an embodiment in the present invention. This diagram is merely an example, which should not unduly limit the scope of the claims herein. A person having ordinary skill in the art would recognize many variations, alternatives, and modifications. As shown, the software block diagram of the appliance module 1100 includes a variety of elements. Such elements include a physical layer 1101, a driver layer 1103, and an application layer 1105. The physical layer 1101 includes a variety of elements. Such elements include temperature/fog/brightness/infrared sensor 1107, a switch/relay/alarm sensor 1109, and a powerline interface 1111. The driver layer 1103 includes a variety of elements. Such elements include a serial port driver 1113, a sensor driver 1115, a Zigbee driver 1117, a controller driver 1119, a General Purpose Input/Output (GPIO) driver 1121, and a powerline driver 1123. The application layer 1105 includes a variety of elements. Such elements include a data collection module 1125, a command and control module 1127 and a data and command communication module 1129.

The software for the appliance module represented in the block diagram of FIG. 11 may perform a variety of functions. Such appliance module software may allow the appliance module to take measurements of energy usage. The software may control the method of coupling appliance module to the client device for energy monitoring or control. For example, appliance module software may determine whether to remotely or locally couple to client devices, either via direct connection or wirelessly.

Appliance module software may control the sending or receiving of data signals across the powerline network or the wireless network, or the integrated network infrastructure. The software may allow appliance module to provide wireless connectivity to the powerline network backbone. For example, at a certain premises location, appliance module software may provide a client device a wireless connection to the powerline network.

Data measurements at appliance module may be controlled by appliance module software. The software may control the measurement of power usage information such as instantaneous power, peak power, or average power. The method of data collection, via either network infrastructure, or via local or remote coupling to client devices may be controlled by appliance module software. The software may control sending such data to gateway via network infrastructure.

Command or control of client devices coupled to appliance module may be carried out by appliance module software. The software may control the provisioning of high, low, or other bandwidth signals to client devices via appliance module coupling.

Figure 12:
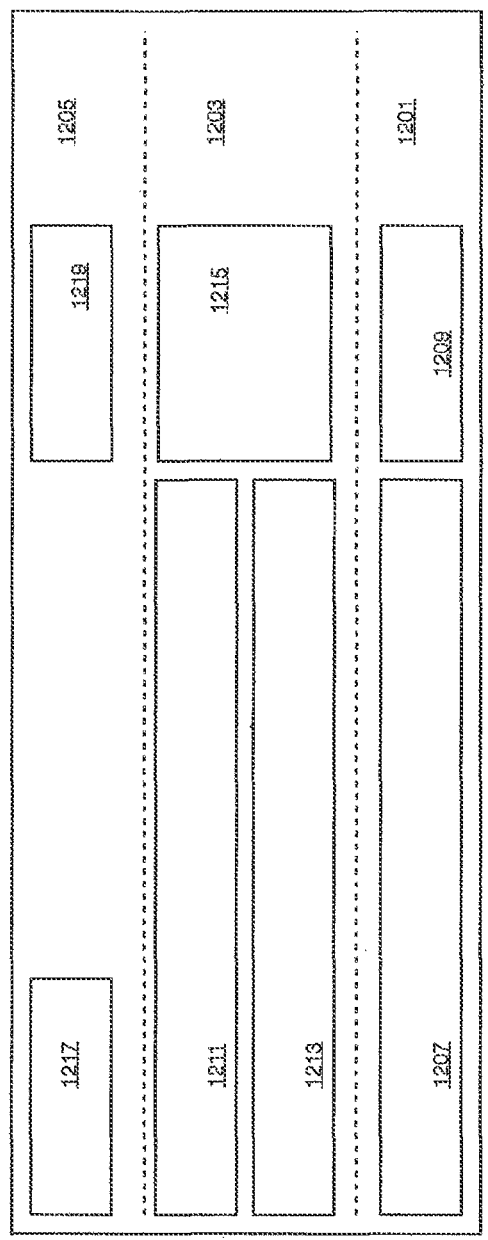
FIG. 12 is a simplified software block diagram for the panel meter and serial bridges according to an embodiment in the present invention.

FIG. 12 is a simplified software block diagram for the panel meter and serial bridges according to an embodiment in the present invention. This diagram is merely an example, which should not unduly limit the scope of the claims herein. A person having ordinary skill in the art would recognize many variations, alternatives, and modifications. As shown, the panel meter and serial bridge software block diagram includes a variety of elements. Such elements include a physical layer 1201, a driver layer 1203, and an application layer 1205. The physical layer 1201 includes a variety of elements. Such elements include a power measure or serial port module 1207 and a powerline module 1209. The driver layer 1203 includes a variety of elements. Such elements include a serial port driver 1211, a sensor driver 1213, and a powerline driver 1215. The application layer 1205 includes a variety of elements. Such elements include a data collection module 1217 and a data/command communication module 1219.

The software for the panel meter and serial bridges represented in the block diagram of FIG. 12 may perform a variety of functions. In regards to panel meter functionality, the panel meter software allows panel meter to take energy measurements at the electrical circuit breaker or distribution panel. Panel meter software may control the measurement or energy usage data from panel meter current sensor module as well as the transmission of data signals into premises wiring circuits or network infrastructure. The software may support communication between panel meter and gateway or a variety of client devices via network infrastructure.

Panel meter software may control the scheduling of energy usage measurements. For example, panel meter software may schedule measurements to be conducted in real time or to be taken periodically. Backup power module support of panel meter may be controlled by panel meter software. The software may efficiently command or control panel meter functionality in a low power mode in order to conserve energy or maintain security. Safe mode operation and functionality of panel meter may be controlled with panel meter software as well as alert message generation.

Serial bridge software as represented in FIG. 12 may perform a variety of functions. The software may allow serial bridge to send or receive data across network infrastructure. Serial bridge software may support the connectivity of serial based devices to the network infrastructure and the command or control of such devices. The software may also facilitate the gathering of data from serial based devices.

Figure 13:
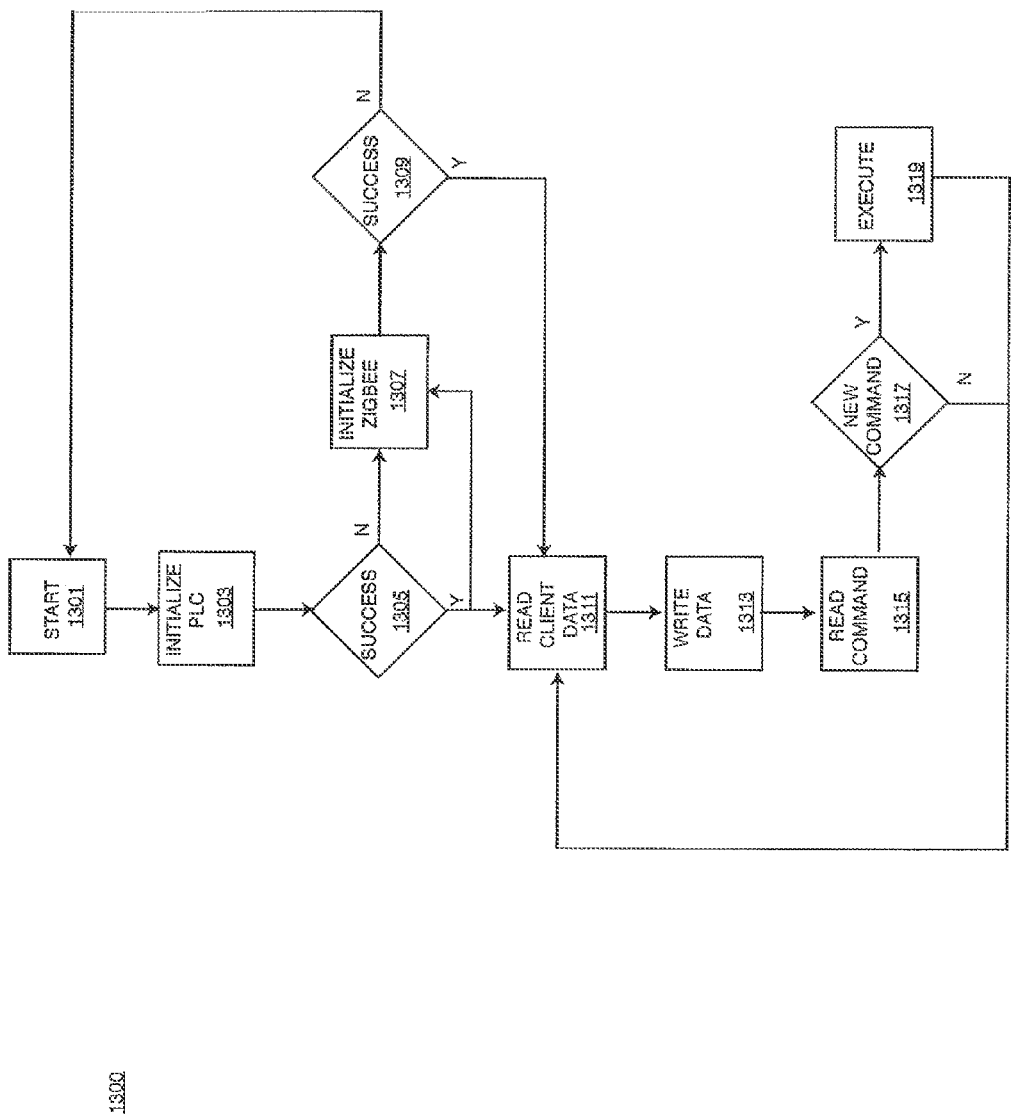
FIG. 13 is a simplified software data collection flow diagram for the gateway according to an embodiment in the present invention.

FIG. 13 is a simplified software flow diagram for the gateway according to an embodiment in the present invention. This diagram is merely an example, which should not unduly limit the scope of the claims herein. A person having ordinary skill in the art would recognize many variations, alternatives, and modifications. As shown, the simplified software data query flow diagram for the gateway starts 1301 by initializing a power measure module 1303. If the initialization is successful 1305, the next step is to read the data 1311, and then write the collected data using the buffering process 1313. The system then reads the command using the buffering process 1315. If the new command is successfully read 1317, then the system will execute the command 1319. If the command is unsuccessful 1317, then the system repeats itself and reads the data again 1311. If the initialization for the power measure module 1303 is unsuccessful 1305, the next step is to initialize the Zigbee module 1307. If the initialization is successful 1309, the next step is to read the data 1311, and then write the collected data using the buffering process 1313. The system then reads the command using the buffering process 1315. If the new command is successfully read 1317, then the system will execute the command 1319. If the command is unsuccessful 1317, then the system repeats itself and reads the data again 1311. If the initialization for the Zigbee module is unsuccessful 1309, then the system starts again 1301.

Figure 14:
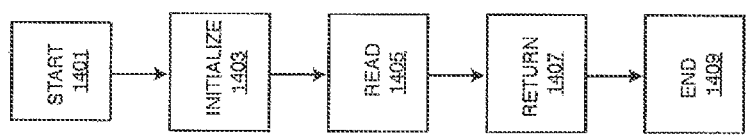
FIG. 14 is a simplified software data query flow diagram for the gateway according to an embodiment in the present invention.

FIG. 14 is a simplified buffering flow diagram for the gateway according to an embodiment in the present invention. This diagram is merely an example, which should not unduly limit the scope of the claims herein. A person having ordinary skill in the art would recognize many variations, alternatives, and modifications. As shown, the buffering flow diagram for the gateway is starts 1401 by obtaining initializing 1403 and then reading the data 1405 and returning a value 1407. Then the process terminates 1409.

Figure 15:
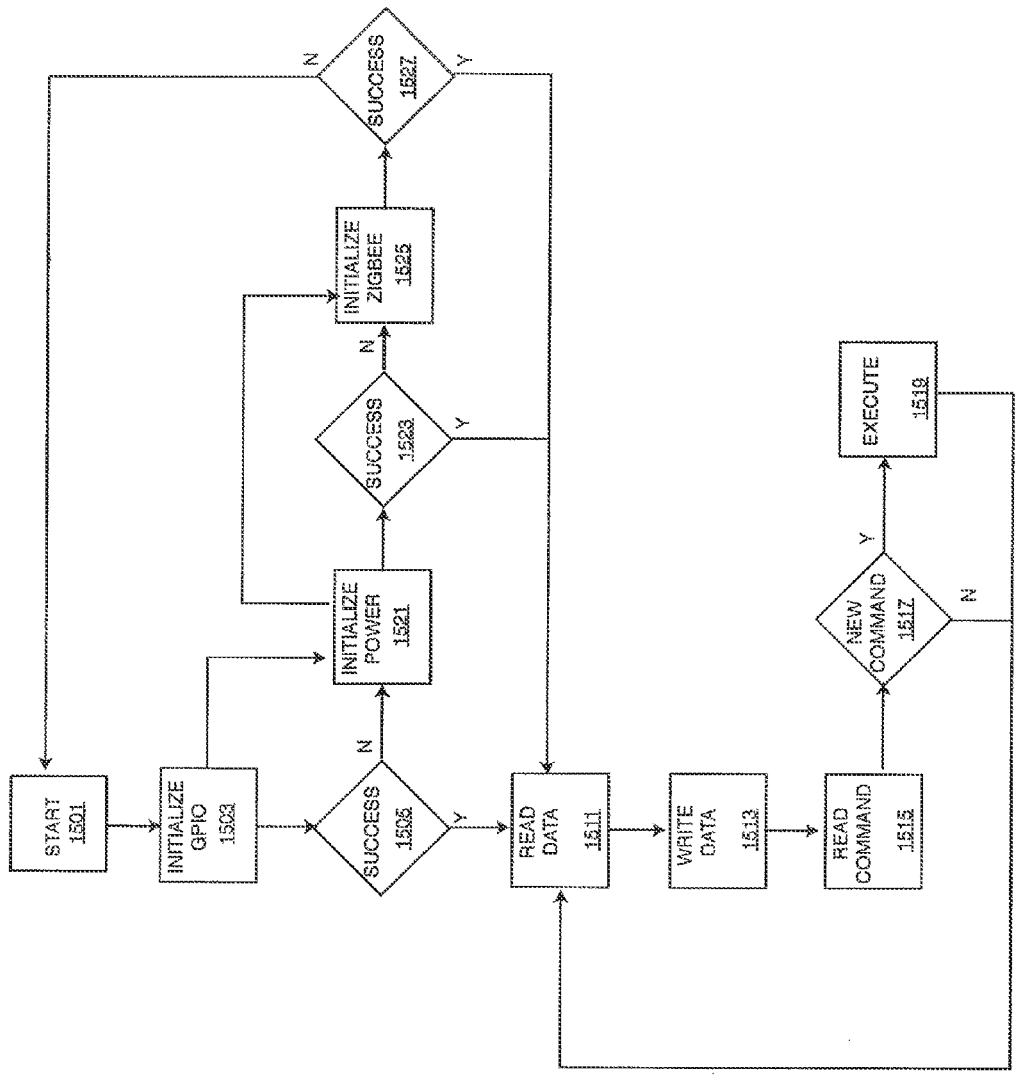
FIG. 15 is a simplified software flow diagram for the appliance module according to an embodiment in the present invention.

FIG. 15 is a simplified software flow diagram for the appliance module according to an embodiment in the present invention. This diagram is merely an example, which should not unduly limit the scope of the claims herein. A person having ordinary skill in the art would recognize many variations, alternatives, and modifications. As shown, the simplified software data query flow diagram for the appliance module starts 1501 by initializing a General Purpose Input/Output (GPIO) 1503. If the initialization is successful 1505, the next step is to read the data 1511, and then write the collected data using the buffering process 1513. The system then reads the command using the buffering process 1515. If the new command is successfully read 1517, then the system will execute the command 1519. If the command is unsuccessful 1517, then the system repeats itself and reads the data again 1511. If the initialization for the GPIO is unsuccessful 1505, the next step is to initialize the power measure module 1521. If the initialization is successful 1523, the next step is to read the data 1511, and then write the collected data using the buffering process 1513. The system then reads the command using the buffering process 1515. If the new command is successfully read 1517, then the system will execute the command 1519. If the command is unsuccessful 1517, then the system repeats itself and reads the data again 1511. If the initialization for the power measure module is unsuccessful 1523, the next step is to initialize the Zigbee module 1525. If the initialization is successful 1527, the next step is to read the data 1511, and then write the collected data using the buffering process 1513. The system then reads the command using the buffering process 1515. If the new command is successfully read 1517, then the system will execute the command 1519. If the command is unsuccessful 1517, then the system repeats itself and reads the data again 1511. If the initialization of the Zigbee module is unsuccessful 1527, then the system starts over again 1501.

The appliance module flow diagram can also start 1501 by initializing a General Purpose Input/Output (GPIO) 1503 and then initializing the power measure module 1521, followed by initializing the Zigbee module 1525. If initialization is successful 1527, then the next step is to read the data 1511, and then write the collected data using the buffering process 1513. The process then reads the command using the buffering process 1515. If the new command is successfully read 1517, then the system will execute the command 1519. If the command is unsuccessful 1517, then the system repeats itself and reads the data again 1511.

Figure 16:
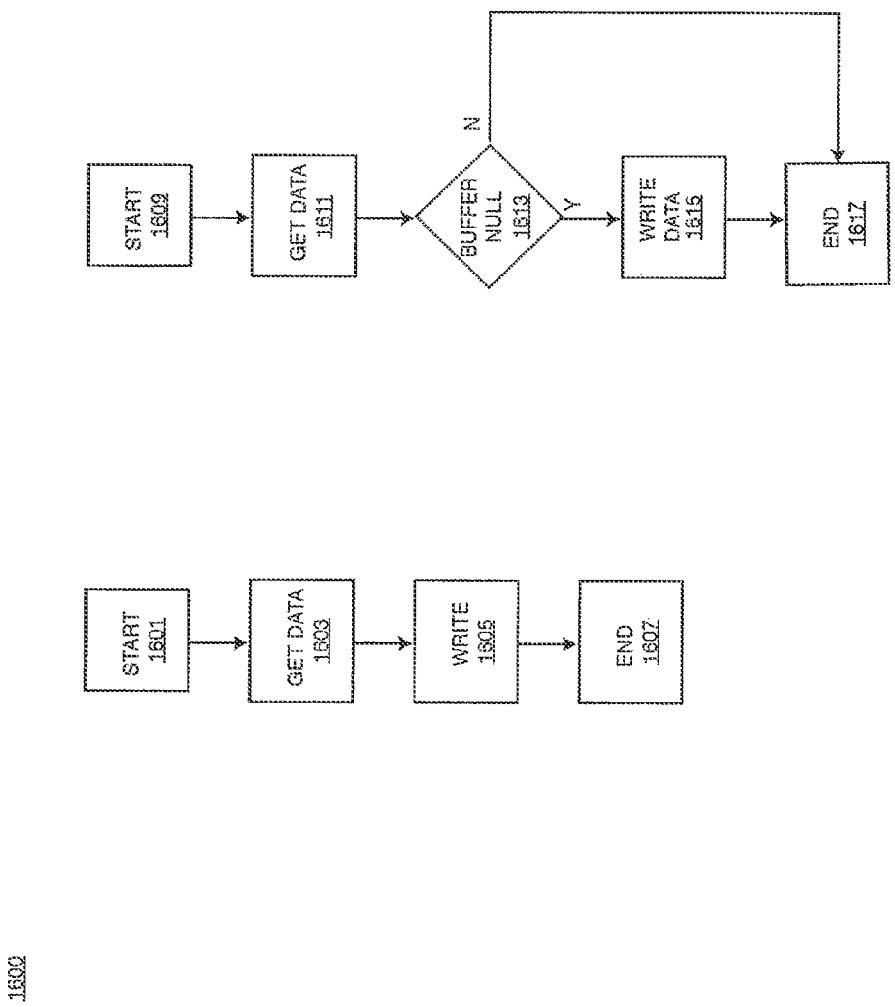
FIG. 16 is a simplified software buffer process flow diagram for the appliance module according to an embodiment in the present invention.

FIG. 16 is a simplified buffering flow diagram for the panel meter according to an embodiment in the present invention. This diagram is merely an example, which should not unduly limit the scope of the claims herein. A person having ordinary skill in the art would recognize many variations, alternatives, and modifications. As shown, the buffering flow diagram for the panel meter is starts 1601 by obtaining the powerline data 1603 and then writes the data using the buffering process 1605, which then terminates 1607. The buffering process then starts again 1609 by reading the buffered data 1611. If the un-buffered process is successful or null 1613, then it will write the data to the powerline module 1615 and terminates 1617. If the un-buffer process is unsuccessful, then the process terminates 1617.

Figure 17:
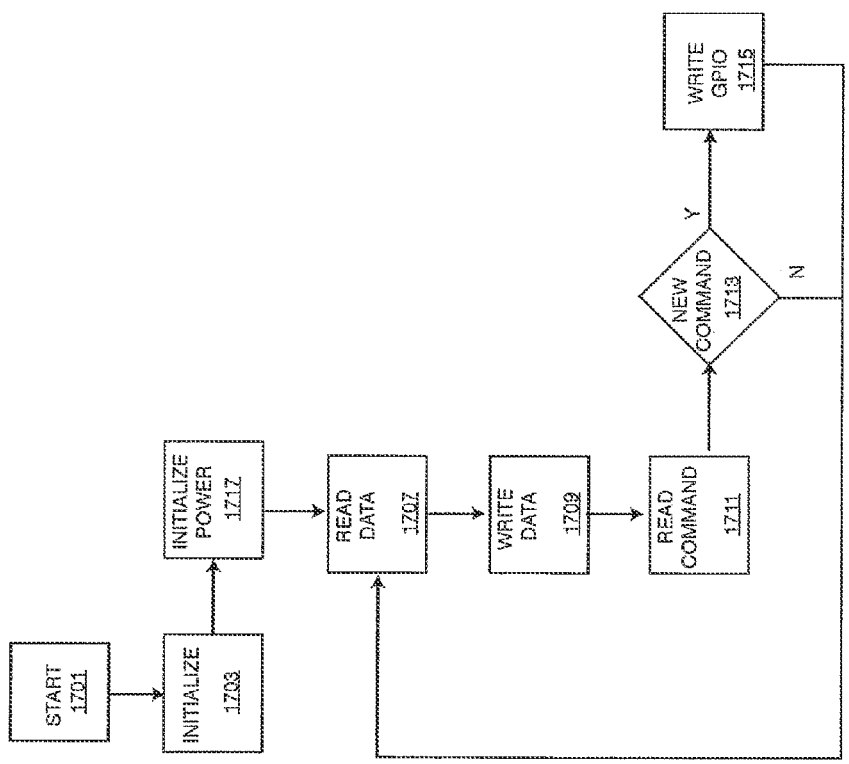
FIG. 17 is a simplified software data query flow diagram for the panel meter according to an embodiment in the present invention.

FIG. 17 is a simplified software data query flow diagram for the panel meter 1700 according to an embodiment in the present invention. This diagram is merely an example, which should not unduly limit the scope of the claims herein. A person having ordinary skill in the art would recognize many variations, alternatives, and modifications. As shown, the simplified software data query flow diagram for the panel meter 1700 starts 1701 by initializing a buffering process 1703, follow by initializing the power measure module 1717. The next step is to read the power measure module data 1707, and then write the collected data using the buffering process 1709. The system then reads the command using the buffering process 1711. If the new command is successfully read, 1713 then the system will write a command to the General Purpose Input/Output (GPIO) 1715. If the command is unsuccessful 1713, then the system repeats itself and reads the power measure data again 1707.

Figure 18:
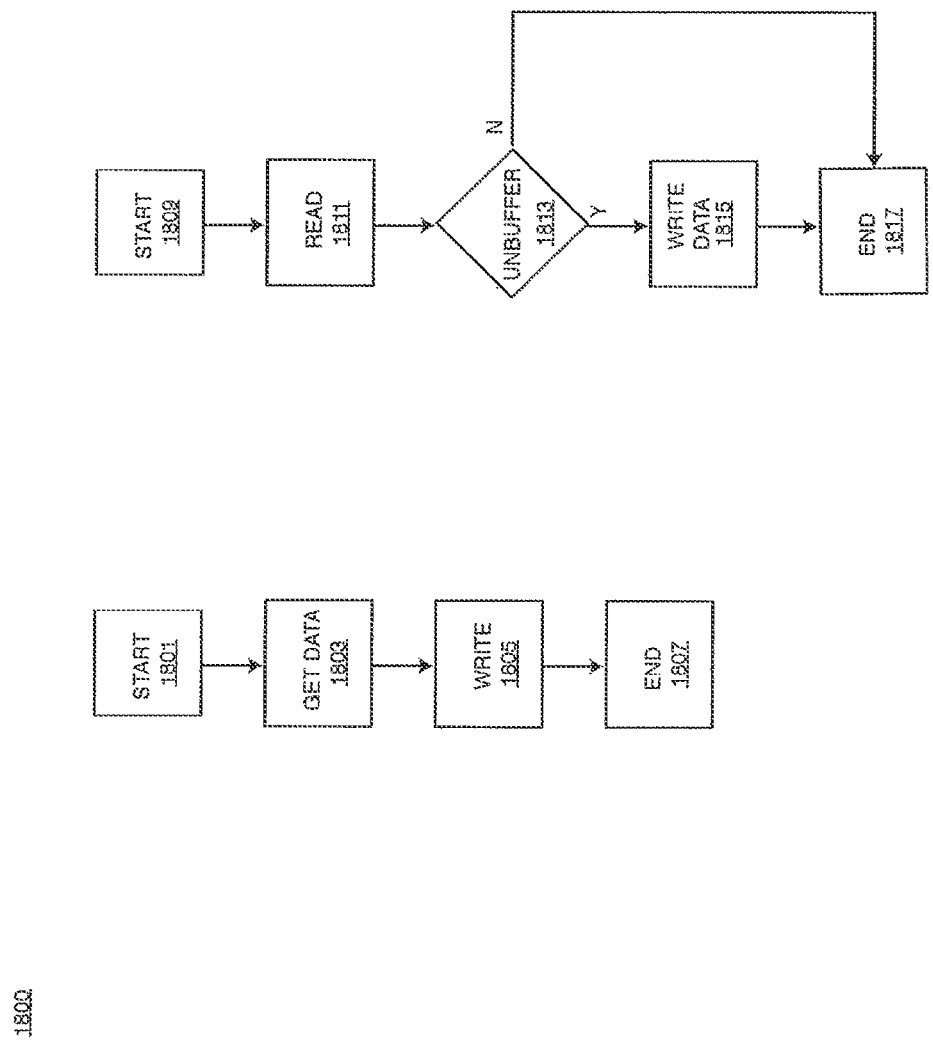
FIG. 18 is a simplified software buffer process flow diagram for the panel meter according to an embodiment in the present invention.

FIG. 18 is a simplified buffering flow diagram for the panel meter according to an embodiment in the present invention. This diagram is merely an example, which should not unduly limit the scope of the claims herein. A person having ordinary skill in the art would recognize many variations, alternatives, and modifications. As shown, the buffering flow diagram for the panel meter is starts 1801 by obtaining the powerline data 1803 and then writes the data using the buffering process 1805, which then terminates 1807. The buffering process then starts again 1809 by reading the buffered data 1811. If the un-buffered process is successful 1813, then it will write the data to the powerline module 1815 and terminates 1817. If the un-buffer process is unsuccessful, then the process terminates 1817.

Figure 19:
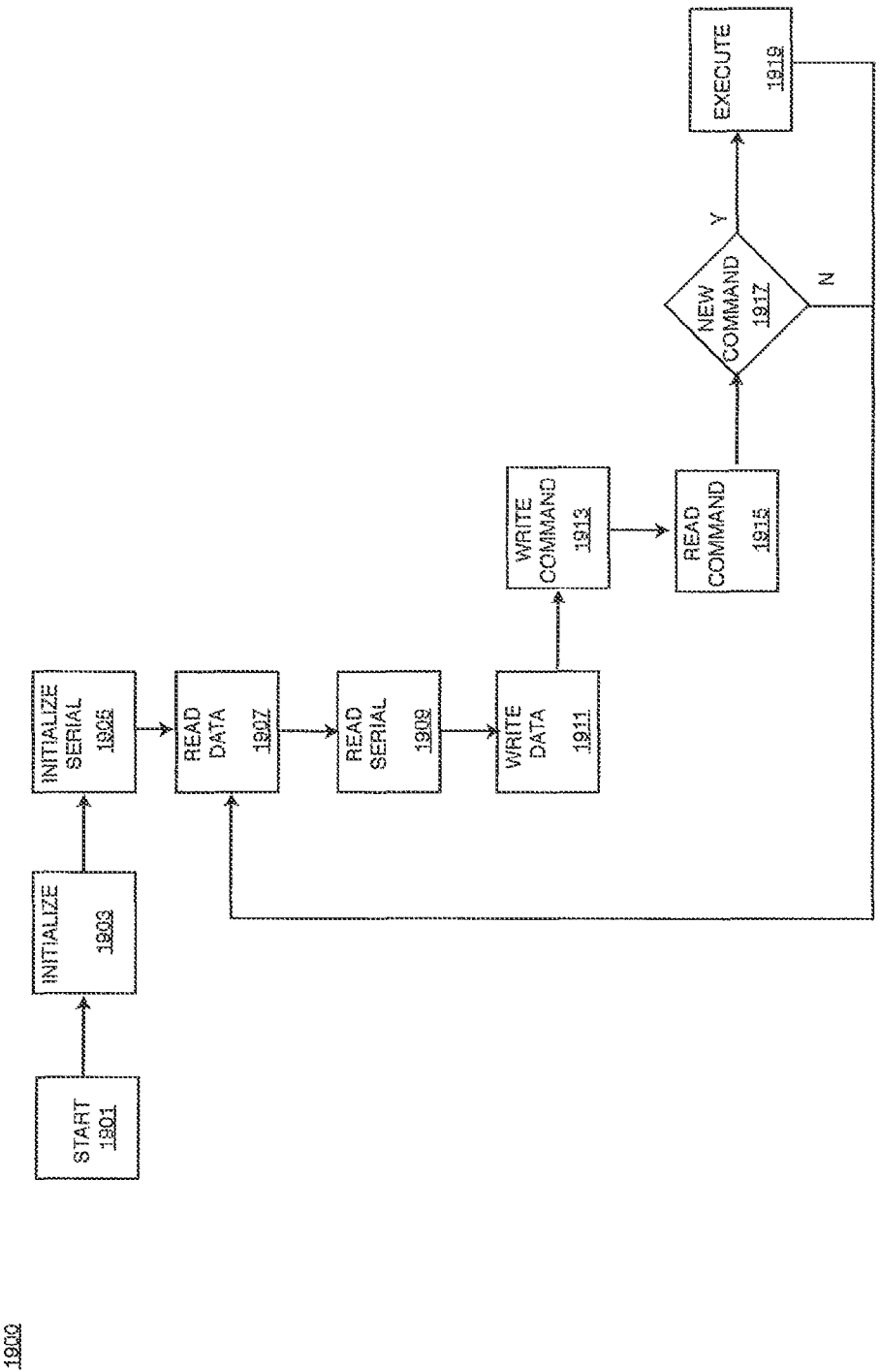
FIG. 19 is a simplified software flow diagram for the RS232 Bridge and RS485 Bridge according to an embodiment in the present invention.

FIG. 19 is a simplified software data flow diagram 1900 for the serial bridge according to an embodiment in the present invention. This diagram is merely an example, which should not unduly limit the scope of the claims herein. A person having ordinary skill in the art would recognize many variations, alternatives, and modifications. As shown, the software block diagram of the serial bridge 1900 starts 1901 by initializing a buffering process 1903. The system will then initialize the serial data 1905. The next step will then read the power measure module data 1907 and then, the serial data 1909. The next step in the system is to write the collected data 1911 and then write the command 1913 using a buffering process. The system will then read the command 1915. If the new command is successful read 1917, then the command is executed 1919. If the new command is not read successfully 1917, the system repeats itself and reads the power measure module data 1907.

FIG. 20 is a simplified buffering flow diagram for the serial bridge according to an embodiment in the present invention. This diagram is merely an example, which should not unduly limit the scope of the claims herein. As shown, the buffering flow diagram for the serial bridge 2000 starts 2001 by obtaining the powerline data 2003 and then writes the data using the buffering process 2005, which then terminates 2007. The buffering process then starts again 2009 by reading the buffered data 2011. If the un-buffered process is successful 2013, then it will write the data to the powerline module 2015 and terminates 2017. If the un-buffer process is unsuccessful, then the process terminates 2017.

Figure 21:
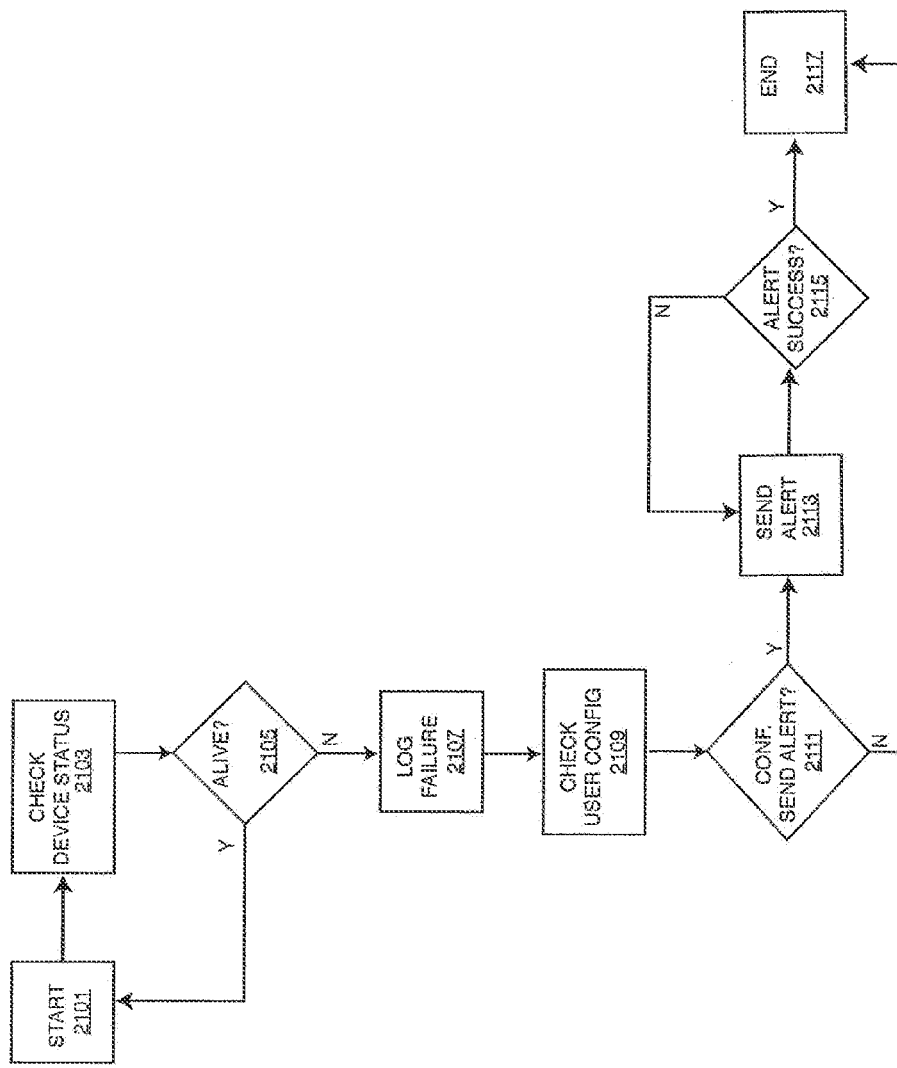
FIG. 21 is a simplified software alert process flow diagram for the gateway according to an embodiment in the present invention.

FIG. 21 is a simplified alert process flow diagram for the gateway according to an embodiment in the present invention. This diagram is merely an example, which should not unduly limit the scope of the claims herein. As shown, the process starts 2101 by checking the status of each client device by sending a ping to each device 2103. If the client device is responds 2105, then the process starts over again 2101. If the client device does not respond, then the gateway logs the failure 2107. The gateway then checks the user configuration 2109. If the gateway is configured to send alert 2111, then the gateway will send alert via email and/or text 2113. If the alert was successfully sent 2115, then the process terminates 2117. If the alert was not successfully sent 2115, then the gateway will repeat to send alert again 2113. If the gateway is not configured to send alert 2111, then the process terminates 2117.

Figure 22:
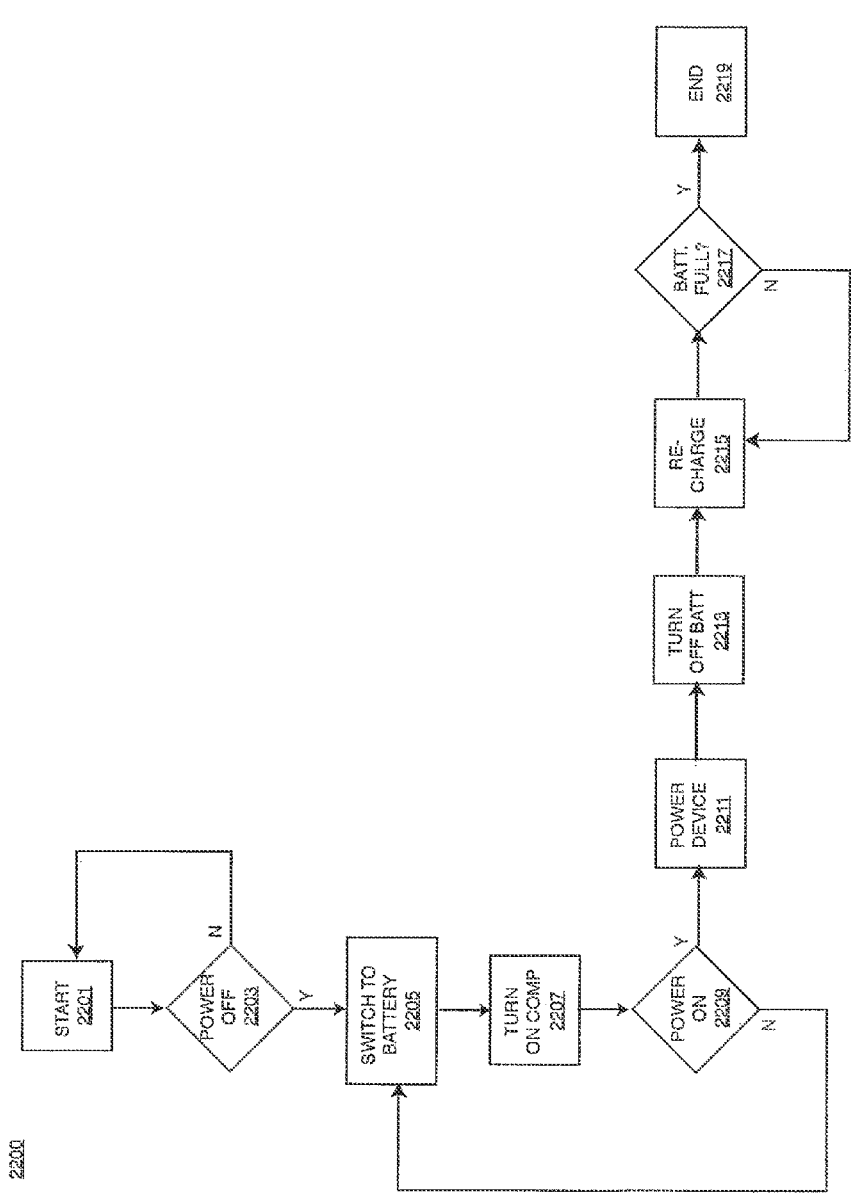
FIG. 22 is a simplified process diagram for the backup battery according to an embodiment in the present invention.

FIG. 22 is a simplified process diagram for the backup battery according to an embodiment in the present invention. This diagram is merely an example, which should not unduly limit the scope of the claims herein. As shown, the process starts 2201 when it checks if power is off or not 2203. If power is not off, then the device repeats to check if power is off or not 2201. If power is off, then the device switches to the backup battery 2205. The next process turns on a limited set of components 2207. If the power turns back on 2209, then the device turns on the entire device 2211. The battery will then turn off 2213 and begins recharging the battery 2215. When the battery is full 2217, the process ends. If the battery is not full, the battery will continue to recharge 2215. If the power does not turn back on 2209, the process returns to maintain to backup battery 2205.

Figure 23:
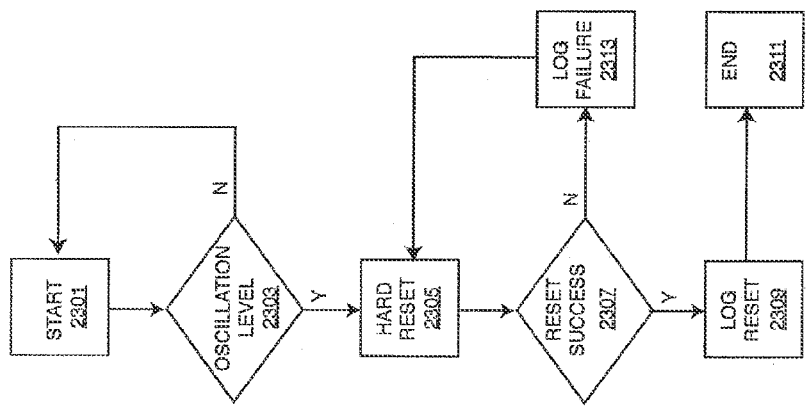
FIG. 23 is a simplified process diagram for a hard reset method according to an embodiment in the present invention.

FIG. 23 is a simplified process diagram for a hard reset method according to an embodiment in the present invention.

This diagram is merely an example, which should not unduly limit the scope of the claims herein. As shown, the process starts 2301 by checking the oscillation level 2303. If it is at the right level and no hard reset is needed, then it repeats the process and starts 2301 over again. If the oscillation level 2303 is not correct and a hard reset is needed, then the device will perform a hard reset 2305. If the hard reset was successful 2307, it will log the reset 2309 and terminate 2311. If the hard reset was not successful 2307, it will log failure 2313 and try to perform hard reset 2305 again.

The hard reset method may be applied to a variety of applications and or devices. For example, the hard reset method may be applied to the devices disclosed in the present system for intelligent energy management and control. Gateway 300, appliance module 400, panel meter 500, RS232 Bridge 600, or RS485 Bridge 700 may be equipped with hard reset functionality. Additionally, the hard reset may be applied to other network enabled devices such as modems, routers, switches, etc. Furthermore, hard reset functionality may be applied to any electronic device utilizing integrated circuits and or chipsets. Hard reset functionality in accordance with the preferred embodiment described here allows such devices to automatically re-boot or re-load after the device ceases to function properly or becomes locked-up, frozen or stalled. Traditionally, such devices must be manually powered off or reset in order to bring the device back online and functioning properly. The hard reset method disclosed herein allows such devices to automatically reset in the even of a system failure.

Figure 24:
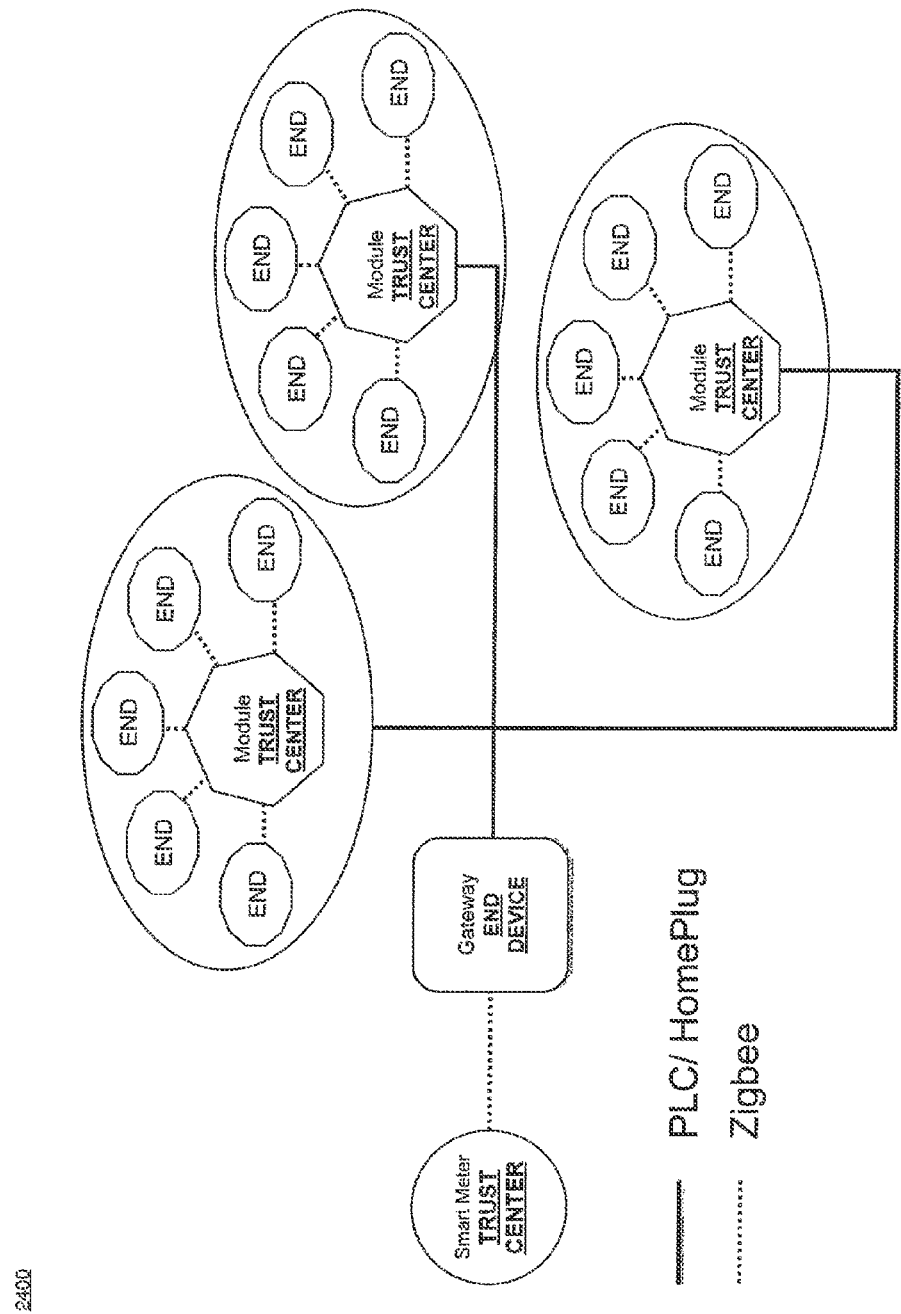
FIG. 24 is a simplified diagram illustrating a Powerline and Zigbee bridging network according to an embodiment in the present invention.

FIG. 24 is a simplified diagram illustrating a Powerline and Zigbee bridging network according to an embodiment in the present invention. FIG. 25 is an alternative simplified diagram illustrating a Powerline and Zigbee bridging network according to an embodiment in the present invention. In a specific embodiment, the present bridging network for powerline technology with Zigbee is included. In one or more preferred embodiments, the network combines and/or bridges at least Zigbee or the like and rf technology. In a specific embodiment, the network includes a Zigbee module or multiple modules and/or sensors using a powerline network backbone, including the HomePlug™ standard PLC to extend Zigbee technology. Of course, there can be other variations, modifications, and alternatives.

The method and system of the present invention thus described, it will be appreciated that numerous modifications and embodiments may be devised by those skilled in the art. Such variations are not to be regarded as a departure from the spirit and scope of the present invention, and all such modifications as would be appreciated to those skilled in the art are intended to be included within the scope of the following claims.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method for operating a system for monitoring and controlling power usage in a home or industrial setting, the method comprising:
   in a the system comprising:
   a gateway apparatus comprising:
      a powerline module configured to transmit information at one or more first frequencies ranging from 1 to 30 MHz, the powerline module being coupled to a powerline network, the powerline network being coupled to one or more appliances; a control module configured to transmit information at one or more second frequencies ranging from 250 KHz to 400 KHz, the control module being configured to control one or more appliances coupled to the power line from information received from one or more appliances;
      a wireless module configured to transmit information at one or more third frequencies;
   a circuit sensor device comprising a plurality of input sites, the input sites being coupled to respective circuit breaker elements in a circuit distribution panel, the circuit sensor device being coupled to the powerline module via one or more powerline networks to transmit power consumption information in either at least real time or a selected time frequency;
   a panel device comprising a first input, a second input, and a third input respectively coupled to a power source including a first phase, a second phase, and a third phase, the panel device being configured to output power information; and
   an appliance module coupled to the gateway apparatus, the appliance module being configured to turn on or turn off one or more appliances, the appliance module being coupled to the control module using either or both of wireless module or the control module; and
   transferring a control signal to the appliance module to turn on or turn off one or more appliances.

2. The method of claim 1 further comprising one or more communication ports, the one or more communication ports being coupled to the control module, the one or more communication ports being configured for at least one format selected from GSM, Cellular, Fiber, Coaxial, Ethernet, Zigbee, RS232, RS485, M-bus, USB, Firewire, 802.XXX, WiLan, WiMax, Powerline, HomePNA, and MOCA; wherein the appliance module is configured to measure power consumption in real time.

3. The method of claim 1 wherein the appliance module comprising an element selected from a thermal sensor, a humidity sensor, a security sensor, a motion sensor, a light sensor, one or more pressure sensors, one or more microphones, one or more audio devices, one or more vibration sensors, a gyro or accelerometer, one or more smoke sensors, or a biological sensor.

4. The method of claim 1 wherein the appliance module comprising one or more combinations of sensor devices; wherein the one or more third frequencies of 2 GHz is 2.5 GHz.

5. The method of claim 1 wherein each of the appliance module, the powerline module, control module, wireless module, and circuit sensor device comprising one or more batteries as a power backup.

6. The method of claim 1 further comprising a routing device, the routing device being coupled to the control module.

7. The method of claim 1 further comprising a reset module configured to perform a soft or hard reset remotely using at least information from the control module or other module.

8. The method of claim 1 wherein the wireless module configured to communicate to one or more appliance modules.

9. A system for monitoring and controlling power usage, the system comprising:
   a gateway apparatus comprising:
      a powerline module configured to transmit information at one or more first frequencies, the powerline module being coupled to a powerline network, the powerline network being coupled to one or more appliances;

a control module configured to transmit information at one or more second frequencies ranging from 250 KHz to 400 KHz, the control module being configured to control one or more appliances coupled to the power line from information received from one or more appliances;

a wireless module configured to transmit information at one or more third frequencies;

a circuit sensor device comprising a plurality of input sites, the input sites being coupled to respective circuit breaker elements in a circuit distribution panel, the circuit sensor device being coupled to the powerline module via one or more powerline networks to transmit power consumption information in either at least real time or a selected time frequency; and a reset module configured to perform a soft or hard reset of the gateway apparatus remotely using at least information from the control module or other module.

10. The system of claim 9 wherein the reset module is configured using one or more integrated circuits configured to reset at least the gateway apparatus; wherein the one or more third frequencies is 2.4 GHz.

11. A method for operating a system for managing power usage in a home or industrial setting, the method comprising:
in a the system comprising:
a gateway apparatus comprising:
a powerline module configured to transmit information at a first frequency ranging from 1 to 30 MHz, the powerline module being coupled to a powerline network, the powerline network being coupled to an appliance; a control module configured to transmit information at a second frequency ranging from 250 KHz to 400 KHz, the control module being configured to control the appliance coupled to the power line from information received from the appliance;
a wireless module configured to transmit information at a third frequency;
a circuit sensor device comprising an input site, the input site being coupled to a circuit breaker element in a circuit distribution panel, the circuit sensor device being coupled to the powerline module via the powerline network to transmit power consumption information in either at least real time or a selected time frequency;
a panel device comprising a first input, a second input, and a third input respectively coupled a first phase, a second phase, and a third phase of a power source, the panel device being configured to output power information; and an appliance module coupled to the gateway apparatus, the appliance module being configured to turn on or turn off the appliance, the appliance module being coupled to the control module using either or both of wireless module or the control module; and transferring a control signal to the appliance module to turn on or turn off the appliance.

12. The method of claim 11 further comprising a communication port, the communication port being coupled to the control module, the communication port being configured for at least one format selected from GSM, Cellular, Fiber, Coaxial, Ethernet, Zigbee, RS232, RS485, M-bus, USB, Firewire, 802.XXX, WiLan, WiMax, Powerline, HomePNA, and MOCA; wherein the appliance module is configured to measure power consumption in real time.

13. The method of claim 11 wherein the appliance module comprises an element selected from a thermal sensor, a humidity sensor, a security sensor, a motion sensor, a light sensor, a pressure sensor, a microphone, an audio device, a vibration sensor, a gyro or accelerometer, a smoke sensor, or a biological sensor.

14. The method of claim 11 wherein the appliance module comprises one or more combinations of a sensor device; wherein the third frequency ranges from 2 GHz is 2.5 GHz.

15. The method of claim 11 wherein the appliance module comprises a battery for a power backup.

16. The method of claim 11 further comprising a routing device, the routing device being coupled to the control module.

17. The method of claim 11 further comprising a reset module configured to perform a soft reset or hard reset remotely using at least information from the control module or other module.

18. The method of claim 11 wherein the wireless module is configured to communicate to one or more appliance modules.

19. The method of claim 11 wherein the transferring is provided from a remote device.

20. The method of claim 11 wherein the transferring is provided from a mobile device.

* * * * *